(12) United States Patent
Kilchenko et al.

(10) Patent No.: US 10,203,861 B2
(45) Date of Patent: Feb. 12, 2019

(54) MESSAGING WINDOW OVERLAY FOR A BROWSER

(71) Applicant: Please Don't Go, LLC., Boca Raton, FL (US)

(72) Inventors: Pavel S. Kilchenko, Otradnoe (RU); Gene I. Kofman, Parkland, FL (US); Michael G. Makar, Boca Raton, FL (US); Tracy A. Tindall, Boca Raton, FL (US)

(73) Assignee: Please Don't Go, LLC., Boca Raton, FL (US)

( * ) Notice: Subject to any disclaimer, the term of this patent is extended or adjusted under 35 U.S.C. 154(b) by 62 days.

(21) Appl. No.: 15/200,600

(22) Filed: Jul. 1, 2016

(65) Prior Publication Data

US 2016/0313906 A1    Oct. 27, 2016

Related U.S. Application Data

(63) Continuation-in-part of application No. 14/287,815, filed on May 27, 2014, and a continuation-in-part of
(Continued)

(51) Int. Cl.
*G06F 15/16* (2006.01)
*G06F 3/0484* (2013.01)
(Continued)

(52) U.S. Cl.
CPC .......... *G06F 3/04847* (2013.01); *G06F 3/013* (2013.01); *G06F 3/0485* (2013.01);
(Continued)

(58) Field of Classification Search
CPC ........... H04M 3/5183; H04M 3/42161; H04M 3/5175; H04L 67/18; H04L 12/581; H04L 51/04
See application file for complete search history.

(56) References Cited

U.S. PATENT DOCUMENTS

| 7,113,918 B1 * | 9/2006 | Ahmad | G06Q 30/00 345/156 |
| 7,552,365 B1 * | 6/2009 | Marsh | G06F 11/0709 707/999.003 |

(Continued)

*Primary Examiner* — Hitesh Patel
(74) *Attorney, Agent, or Firm* — Fleit Gibbons Gutman Bongini Bianco PL; Jon A. Gibbons

(57) ABSTRACT

A system and process for launching a messaging window such as a chat bot, especially on a mobile platform, such a smart phones and tablets, is described. The process begins with displaying a web page with webpage contents in a browser window with a primary top bar and a display window. In response to receiving user input to scroll the webpage contents of the browser window are scrolled in a horizontal direction, a vertical direction, or a combination thereof. Also, a secondary top bar, as a previously invisible graphical element within the webpage contents of the web page is now displayed in substantial position and with the substantially the same appearance to look like the primary the top bar. In response to receiving user input in the vicinity of the secondary top bar, the system triggers a presentation of a messaging window or chat window.

16 Claims, 20 Drawing Sheets

Related U.S. Application Data application No. 13/277,420, filed on Oct. 20, 2011, now Pat. No. 8,738,739, and a continuation-in-part of application No. 13/084,060, filed on Apr. 11, 2011, now Pat. No. 8,949,377, and a continuation-in-part of application No. 12/124,531, filed on May 21, 2008, now Pat. No. 7,962,578.

(60) Provisional application No. 62/188,125, filed on Jul. 2, 2015.

(51) Int. Cl.
| | |
|---|---|
| *G06F 3/0485* | (2013.01) |
| *G06F 3/0488* | (2013.01) |
| *G06F 3/01* | (2006.01) |
| *G06F 17/30* | (2006.01) |
| *G06N 99/00* | (2010.01) |
| *G06Q 10/10* | (2012.01) |
| *G06Q 30/02* | (2012.01) |
| *H04L 12/58* | (2006.01) |
| *G06F 3/147* | (2006.01) |
| *G06F 9/451* | (2018.01) |

(52) U.S. Cl.
CPC ............ *G06F 3/0488* (2013.01); *G06F 3/147* (2013.01); *G06F 17/3087* (2013.01); *G06F 17/30867* (2013.01); *G06N 99/005* (2013.01); *G06Q 10/10* (2013.01); *G06Q 30/02* (2013.01); *G06Q 30/0255* (2013.01); *G06Q 30/0269* (2013.01); *H04L 51/02* (2013.01); *G06F 9/453* (2018.02)

(56) References Cited

U.S. PATENT DOCUMENTS

| | | | |
|---|---|---|---|
| 2009/0216691 A1* | 8/2009 | Borzestowski | G06F 17/3066 706/11 |
| 2010/0211431 A1* | 8/2010 | Lutnick | G06Q 30/02 705/14.12 |
| 2012/0159349 A1* | 6/2012 | Kansky | H04L 51/046 715/752 |
| 2014/0244404 A1* | 8/2014 | Manson | G06Q 30/0611 705/14.72 |
| 2015/0121257 A1* | 4/2015 | Kollencheri Puthenveettil | G06F 17/30902 715/760 |
| 2015/0346929 A1* | 12/2015 | Karunamuni | G06F 3/0483 715/777 |

* cited by examiner

| 802 AFFILIATE WEBSITE ID | 804 REASON FOR DISCONTINUING A TRANSACTION | 806 ITEM(S) | 808 END USER ID | 810 DATE | 812 TIME | 814 URL | |
|---|---|---|---|---|---|---|---|
| WEBSITE B | SELECTION | WOMEN'S SHOES | 57196450 | 5/1/2011 | 11:34AM | | |
| WEBSITE A | SHIPPING COSTS | MODEL XYZ HD TV | 15730567 | 5/4/2011 | 6:40PM | | |
| WEBSITE C | FINANCING | HOUSE PAINTING | 64429861 | 5/11/2011 | 2:52pm | | |
| ... | ... | ... | ... | ... | ... | ... | ... |

CHAT SERVER RECORD

FIG. 8

| 1410 Geographic Location of End User | 1412 AGE OF END USER | 1414 GENDER OF END USER | ETHNICITY OF END USER | 1416 LANGUAGE | 1418 RELIGIOUS AFFILIATION | 1420 | 1422 TRAFFIC SOURCE | 1424 WEBPAGE HISTORY | 1426 NUMBER OF RELATED WEB PAGES | 1428 NUMBER OF TERMS | 1430 SEARCH ENGINE TERMS | 1432 ITEMS REVIEWED ON WEB PAGES |
|---|---|---|---|---|---|---|---|---|---|---|---|---|
| 1460) 33487 | 55+ | F | WHITE | SPANISH | NONE | | HYPERLINK FROM SEARCH ENGINE RESULTS | WEBPAGE A WEBPAGE B WEBPAGE C WEBPAGE D | 0 | 0 | TERM A TERM B TERM C TERM D | 0 |
| 1462) 192.192.1.1 | 21 | F | WHITE | FRENCH | CHRISTIAN | | HYPERLINK FROM SPONSOR ADS | WEBPAGE Z | 2 | 1 | TERM Z | 6 |
| 1464) 26.380798, -80.086212 | 68 | M | HISPANIC | ENGLISH | JEWISH | | UNKNOWN | WEBPAGE R DOMAIN A WEBPAGE D DOMAIN B | 5 | 2 | TERM R TERM S | 2 |
| 1466) FLORIDA | 41 | F | BLACK | FRENCH | CHRISTIAN | | HYPERLINK FROM SMS MESSAGE | WEBPAGE G WEBPAGE H WEBPAGE I | 1 | 4 | TERM G TERM H TERM I | 8 |
| 1468) 12602 | 35 | M | ASIAN | ENGLISH | MUSLIM | | HYPERLINK FROM SMS MESSAGE | WEBPAGE N WEBPAGE M | 7 | 1 | TERM N TERM M | 3 |
| 1470) USA | 28 | UNKNOWN | NATIVE AMERICAN | PORTU-GUESE | NONE | | HYPERLINK FROM EMAIL | WEBPAGE A WEBPAGE Q WEBPAGE K WEBPAGE L | 10 | 10 | TERM A TERM Q TERM K TERM L | 10 |
| 1472) 42.283405, -74.381561 | 29 | M | HISPANIC | HISPANIC | CHRISTIAN | | HYPERLINK FROM SEARCH ENGINE RESULTS | WEBPAGE F | 0 | 0 | TERM F | 0 |
| 1474) 254.3.3.123 | 12 | F | ASIAN | CHINESE | HINDU | | HYPERLINK FROM SMS MESSAGE | WEBPAGE Q WEBPAGE P | 3 | 3 | TERM Q TERM P | 15 |
| 1476) SHOE STORE | 35 | F | BLACK | ENGLISH | CHRISTIAN | | UNKNOWN | WEBPAGE D WEBPAGE X WEBPAGE V | 1 | 1 | TERM D TERM X TERM V | 1 |

| 1434 PRICE OF ITEM(S) ON WEBPAGE | 1436 DOLLAR AMOUNT IN SHOPPING CART | 1438 PAYMENT METHOD | 1440 TIME AND DATE | 1442 VISITOR OR MEMBER / REGISTERED USER | PREVIOUS VISITOR (AS OPPOSED TO BUYER) TO WEBSITE | 1444 TELCO | 1448 OPERATING SYSTEM OF 1446 END USER DEVICE | 1550 SCREEN SIZE / RESOLUTION OF END USER DEVICE | 1552 OTHER WEBSITE SUPPLIED INFORMATION |
|---|---|---|---|---|---|---|---|---|---|
| 0 | $0 | DON'T HAVE | 4.15.14 @ 15:30 | NO | YES | TELCO R | OS A VER 2 BROWSER C | 1920X1080 24" | VISITS FREQUENTLY |
| $120 | $120 | CREDIT CARD | 4.16.14 @ 1:30 | 01.15.12 | YES | TELCO A | OS A VER 1 | 800X600 4" | NEW SIGNUP |
| $140 $130 | $270 | DEBIT CARD | 4.15.14 @ 9:10 | NO | NO | TELCO D | OS B VER 2 | 1024X768 6" | MOTIVATED |
| $16 $13 $10 $21 | $18 | PAYPAL | 4.15.14 @ 23:41 | NO | NO | TELCO B | OS B VER 2 | 1920X1080 10" |  |
| $290 $130 $346 | $766 | MONEY ORDER | 4.14.14 @ 13:13 | 02.13.14 | NO | TELCO J | UNKNOWN | 1920X1080 60" | MEMBERSHIP EXPIRING |
| $416 $374 $219 $221 | $1,230 | POINTS | 4.15.14 @ 7:11 | 09.25.10 | YES | TELCO B | OS A VER 7 BROWSER A APP R | 960X600 7" | COOKIES A FOR SESSION A COOKIES B FOR SESSION B |
| 0 | $0 | DISCOVER | 4.15.14 @ 20:48 | NO | NO | TELCO C | OS D VER 7 | 1280X800 15" |  |
| $171 | $171 | STORE CARD | 4.14.14 @ 3:11 | NO | YES | TELCO A | OS A VER 2 | 2560X1600 9" |  |
| $38 | $38 | GIFT CARD | 4.15.14 @ 19:01 | 07.03.11 | YES | TELCO A | OS A VER 3 | 1024X600 8" | 12602 |

MESSAGING WINDOW OVERLAY FOR A BROWSER

CROSS-REFERENCE TO RELATED APPLICATIONS

This application is which is a continuation and claims priority from prior U.S. Provisional Patent Application No. 62/188,125, filed on Jul. 2, 2015, a continuation-in-part of and claims priority from prior U.S. patent application Ser. No. 14/287,815, filed on May 27, 2014, which is a continuation-in-part of and claims priority from prior U.S. patent application Ser. No. 13/277,420, filed on Oct. 20, 2011, now U.S. Pat. No. 8,738,739, which is a continuation-in-part of and claims priority from prior U.S. patent application Ser. No. 13/084,060, filed on Apr. 11, 2011, now U.S. Pat. No. 8,949,377, which is a continuation-in-part of prior U.S. patent application Ser. No. 12/124,531, filed on May 21, 2008, now U.S. Pat. No. 7,962,578, the entire disclosure of each application is incorporated by reference herein in its entirety.

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

FIELD OF THE INVENTION

This present invention generally relates to the field of internet based marketing and advertising, and more specifically to targeted advertisement, targeted messaging, on an interface for a browser.

BACKGROUND OF THE INVENTION

The sales of mobile computing devices including smartphones and tablets continue to outpace the sales of desktop computers. Owners of websites try reduce the rate at which users abandon their web sites prior to completing registration, completing a lead form or abandoning a shopping cart before final checkout. There are many reasons why users abandon websites. One reason is users are often distracted or confused when interacting with websites. Distractions can be caused by interruptions or simply by rushing or simply a change in expectation, i.e. registration to the website is required. For example, social networking sites typically require registration. Many times a user will often become bashful or unwilling to share information. Although the term "website publishers" and "web retailers" are used throughout this application, it is important to note that the term Lead generation (commonly abbreviated as lead-gen) is a marketing term that refers to the creation or generation of prospective consumer interest or inquiry into a business's products or services. Often, lead generation is associated with marketing activity targeted at generating sales opportunities for a company's sales force. Lead generation often uses a lead form such as a questionnaire for insurance, mortgage, loan, credit card, pre-paid card and the like. A lead is therefore correctly described as information regarding or provided by a consumer that may be interested in making a purchase; whereas, generation is one of a myriad of activities that may produce that information and perceived interest.

SUMMARY OF THE INVENTION

The present invention, also known as TeamSalesAgent™ (TSA) mobile edition, is the solution for e-commerce, lead generation and co-registration websites and web-enabled applets presenting web pages interested in increasing sales, dramatically improving their level of customer service and decreasing the company's overhead costs of using "live" sales agents. This unique chat technology fuses self-learning, artificial intelligence with the popularity and ease of online messaging. TeamSalesAgent works 24/7/365 to deliver increased conversions and decreased abandonment.
TeamSalesAgent Benefits include:
Working with mobile phones and tablets
Make web retailer's site interactive.
Adds social interaction to social networking sites.
Increase web retailer's registrations/memberships.
Increase web retailer's sales.
Increase web retailer's conversation rates.
Drastically decrease web retailer's shopping cart abandonment.
Make web retailer's site interactive.
Up-Sell & Cross-Sell additional products.
No turnaround time for customers-immediate service
Easy integration.
Real time success and failure analysis to new products and sales efforts.

The present invention is uniquely designed to interact with web retailer's customers with real agent reaction times as they give astute answers directly concerning web retailer's products and goals or offer incentives to complete an action. The patented artificial intelligence engine uses the combination of Bayesian probability and statistics keyword selection, natural language parsing and regular expression processing. Every client interaction is recorded and analyzed, and as a result of the analysis, changes in the answer database are made.

More specifically, the present invention provides a method to present a browser-based chat and messaging window ("chat window") made to look like an instant message window from a live person as an exit pop when a user exits a web site. In another example, the present invention launches a chat window during a session, such as after a settable period of time, or after settable period of user inactivity or a combination of both. Many times, a user will abruptly terminate a shopping cart, registration or lead abandonment at a website. In one example, the method includes presenting at least one messaging window after the end-user terminates a web session. Next a message is displayed to the end-user through the messaging window. The response from the end-user is reviewed using a combination of scripting and artificial intelligence. In this example the scripting, the messaging window and the artificial intelligence are all managed via a web site.

In one example, a computer-implemented method for presenting a customized chatbot is disclosed. From a perspective of a chatbot server, the method begins with receiving information associated with a first party. The first party in this example is an end user of a system such as wireless device. The information includes demographic information of the end user and/or behavioral information of the end user. Typically the demographic information is previously gathered through one or more of an IP address or GPS location of the end user, cookies, and information received from the web retailer. Likewise the behavioral information is previously gathered through cookies and information received from the web retailer. The behavioral information includes metadata associated with the end user collected from various sources including the web page document of the web retailer and other metadata collected from other sources.

The behavioral information may include a source identifier of how the end user was directed to the web page of the second part. The source identifier may include any of a referring website from which the end user navigated, a selectable hyperlink selected by the end user. The selectable hyperlink may be in any of a search engine result, a search engine sponsored advertisement, a web page advertisement, an email, and a text message.

A chatbot, typically with a messaging window, is presented on the end user system as a web page document of a second party. The second party in this example is a web retailer. The messaging window is customized to the end user based on of the demographic information and/or the behavioral information of the end user. The messaging window is customized to include of one of an initial greeting, an appearance of the messaging window, and a picture of an agent, or a combination thereof. Customization of the messaging window of the chatbot is managed using a web-based management console hosted by a third party, such as the assignee of the present patent application.

A trigger may be used to launch the chat bot on the end user system. The trigger includes any of leaving the web page, selecting specific links, change in domain, abandon shopping cart, minimizing a web page, inactivity timer expiring, selection of click to chat button, cursor position on the web page, hover position of a cursor on the web page, or a combination thereof.

In another example, an advertisement from an advertisement database is selected. The third party is typically a seller of a good or service that may not be the web page of the web retailer on which the chatbot has been launched. For example, if the web retailer is a furniture store, the advertisement may be a credit card offer. The advertisement is selected based on the demographic information of the end user and the behavioral information of the end user. The advertisement is sent to the end user, after a settable period of time. The advertisement can be delivered to the end user through the chatbot itself. In another example the advertisement is delivered to the end user via any of a text message, an email message, a voice message, a banner advertisement, a print advertisement in print media, a broadcast advertisement; a postal mail advertisement, or a combination thereof. Again here, the selection of the advertisement may be managed using a web-based management console hosted by a third party, such as the assignee of the present patent application.

The messaging interaction between the end user and the chatbot server continues. The chatbot server receives a message from end user via the messaging window. Keywords are identified in the message. A response is selected based on the keywords identified in the message. The response is sent from the chatbot to the end user. In one example the selecting of a response is based on one or more of the demographic information of the end user and the behavioral information of the end user.

In one example, a message received by the chatbot from the end user is an explanation for discontinuing a transaction with the web retailer. The advertisement selected from the advertisement database is selected based on the explanation received.

Example of explanations by the end user includes any of shipping is too expensive, shipping is not available to a shipping address provided by the end user, a selection of at least one of a good and a service offered by the web retailer party is limited, financing is necessary to complete a purchase of at least one of a good and a service offered by the web retailer, an inadequate security of the web page of the web retailer and the end user is on a public computer, an inconvenient time, an inconvenient location of the computer of the end user to complete the transaction with the web retailer, or a combination thereof.

Moreover in another example, the chat bot server identifies when the end user is using a mobile wireless system. Based on the end user system being identified as a mobile wireless system, a message is sent from the chatbot to the end user which includes an invite for a voice telephone call.

In still another example, disclosed a novel system and process for launching a messaging window such as a chat bot, especially in a mobile platforms such a smart phones and tablets. The process begins with displaying a web page in a browser window with a primary top bar and a display window. For some browsers, the top bar includes a back button, an address bar, a tittle, a browser tab, a home button as well as other buttons. In response to receiving user input to scroll the webpage contents, the webpage contents of the browser window are scrolled in a horizontal direction, a vertical direction, or a combination thereof. Also, a secondary top bar, as a previously invisible graphical element within the webpage contents of the web page is now displayed in substantial position and with the substantially the same appearance to look like the primary the top bar. In response to receiving user input in the vicinity of the secondary top bar, the system triggers a presentation of a messaging window or chat window.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention will be apparent from the following detailed description taken in conjunction with the accompanying drawings in which:

FIG. 8 is a data record populated by the chat server with information including reason for discontinuing a transaction;

FIG. 14A and FIG. 14B is table of information illustrating demographic information and behavioral information collected for use in FIG. 13;

DESCRIPTION OF THE PREFERRED EMBODIMENTS

Figure 1:
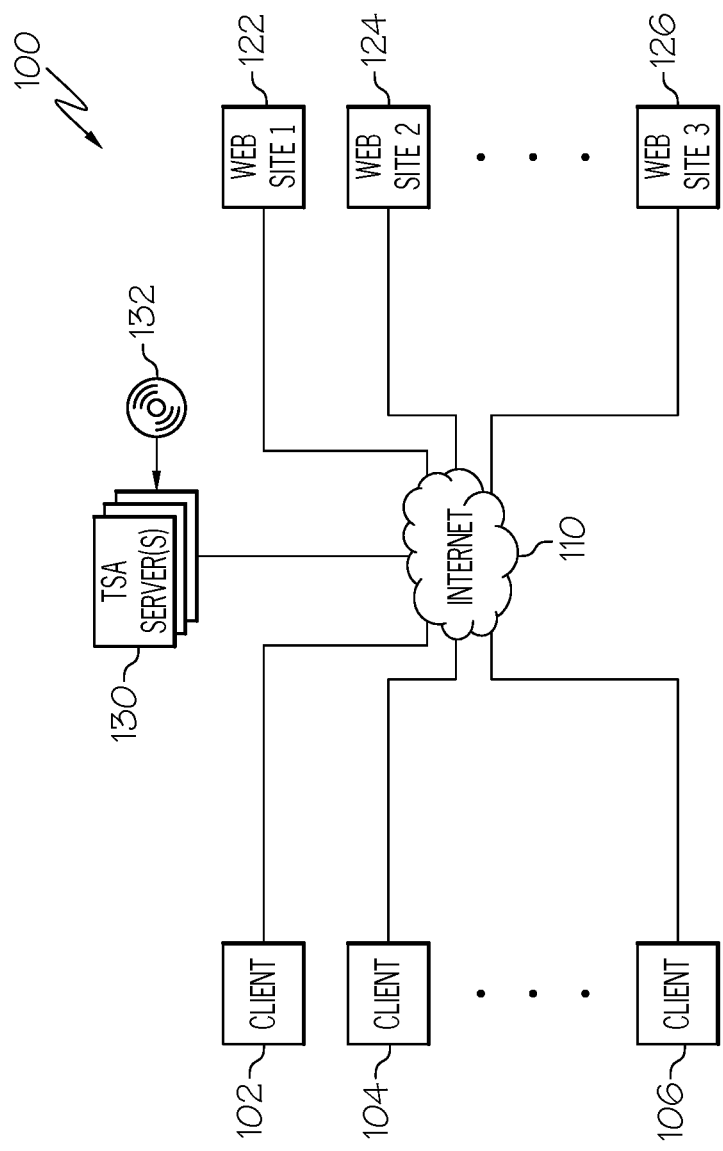
FIG. 1 is a diagram of the overall system for managing deployment and reporting behavior of chatbots, according to the present invention.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as at least one or more than one. The term "plurality", as used herein, is defined as two, or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The terms "program", "software application", and the like as used herein, are defined as a sequence of instructions designed for execution on an information processing circuit. A program, computer program, or software application may include a subroutine, a function, a procedure, an object method, an object implementation, an executable application, an applet, a servlet, a source code, an object code, a shared library/dynamic load library and/or other sequence of instructions designed for execution on an information processing circuit. Further, the terms "present invention" and "Team Sales Agent" or "TSA" or "application" and "applet" are used interchangeably herein.

The term "chatbot" also known as "chatter robot", "chatterbot", "virtual agent", virtual sales agent", "artificial intelligence agent" or "chat bot" is a computer program designed to simulate an intelligent conversation with one or more human users via auditory or textual methods, primarily for engaging in small talk. An aim of such simulation has been to fool the end-user into thinking that the program's output has been produced by a human.

Prior to the present invention, publishers and/or retailers had to primarily rely on exit pops and follow-up emails to attempt to recover lost customers or cross-sell or up-sell them. The present invention is designed to effectively reduce shopping cart, lead and registration abandonment. The present invention has to be capable of up-selling and cross-selling as well, while providing the customer with a satisfactory experience. The present invention is customer friendly and provides real-time campaign management and reporting for publishers. Powered by a self-learning artificial intelligence engine, the present invention assists publishers in increasing their revenue opportunities. The present invention has been successfully deployed and continually enhanced and improved to meet the changes and needs of a growing market.

The present invention recovers many users that abandon websites or web registration process. The chatbot assists with the return of a user to the website or redirection to a third-party website for cross-selling or up-selling. An example would be: sell PC but direct to third-party warranty company for the purpose of closing the sale, to cross sell, up-sell, or build customer relationship.

The present invention provides web retailers with tight control of the artificial intelligence (AI) programming with fast setup to meet the demands of fast moving, easy to turn off and short-lived sales campaign. This is especially important to meet sales campaigns, sales promotions, regional customer demands and seasonal purchases.

Further, the term "campaign" is used to denote a web retailer's campaign during a specific period for a specific area of the web retailer's site. It is important to note that a campaign can be a global campaign, i.e. across multiple web retailers, a target campaign and a default campaign. If a web retailer has only one campaign, by definition it is the default campaign. Further, a "target campaign" can change frequently and be directed to only certain products and services offered through the web retailer's site.

Overall System

Turning now to FIG. 1 is a diagram of the overall system 100 for managing deployment and reporting behavior of chatbots. FIG. 1 shows one or more users or client systems 102, 104, and 106 communicatively coupled over a communications infrastructure 110 to one or more web servers hosting websites 122, 124, and 126. A user system can include a wireless device (e.g., a cellular telephone, a mobile phone, a smartphone and other wireless communication devices such as tablet computers), a laptop/computer, a desktop computer, and other information processing systems.

TeamSalesAgent server(s) 130 is also communicatively coupled to the communications infrastructure 110. The TeamSalesAgent server(s) 130 can be realized in a centralized fashion in one computer system or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature. Although the exemplary embodiments of the present invention are described in the context of a fully functional computer system, those skilled in the art will appreciate that embodiments are capable of being distributed as a program product via CD or DVD, e.g. CD 132, or other form of recordable media, or via any type of electronic transmission mechanism.

Chatbot Chat Window

Figure 2:
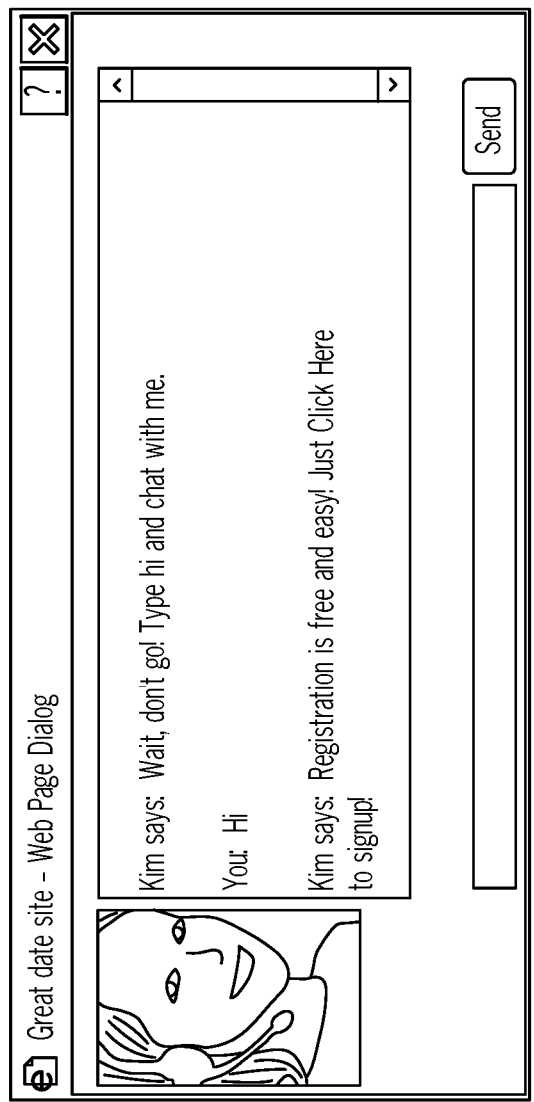
FIG. 2 is an example chatbot on a client system, according to the present invention.

FIG. 2 is an example chatbot chat window on a client system, according to the present invention. The chatbot runs on the client device 102, 104, and 106 typically after a predefined event. An event is either failure to complete a given process or some other predefined condition. Failed tasks include web site registration, lead form and shopping cart abandonment. A predefined event can also include a completed task such as shopping cart checkout, where the chatbot is used to cross-sell other services, such as warranty services. As shown in FIG. 2, in one example the chat window is a messaging window.

When information regarding a specific user is known, the chatbot in one example is customized dynamically to the specific user. For example, specific information about the end-user includes demographic information, such as, the end-user's address and/or zip code and/or age and/or gender and/or race. Information about the end-user can be derived through a variety of sources such as previous registrations with the retailer's site, the end-user's IP address, previous interactions with the chatbot or through other sources. This feature enables highly customizable chatbots specifically tailored to the specific user. Moreover, in another embodiment, not only is the "look and feel" of the chatbot customized to a specific user, but the greetings, the sales pitch and/or the replies are also customized to a specific user.

The picture of the agent, in this example with the name Kim, or chatbot is shown along with a dialog box between Kim and a user (Web retailer). It is important to note that the layout of the chat window is not limited to the window shown and many configurations are contemplated within the true scope and spirit of the present invention. In one example, the skin or "look and feel" of the layout of standard and customizable user interface components and any accompanying graphics of the chatbot chat window can be customized. For example, retailer-A may want a certain color scheme and graphics to match their own corporate branding, while retailer-B may want another color scheme and graphics to match their own corporate branding. These skin definitions are settable using the TSA management console described in more detail below. Furthermore, these skin definitions can be rotated just as the picture of the chatbot.

Chatbot Flow

Figure 3:
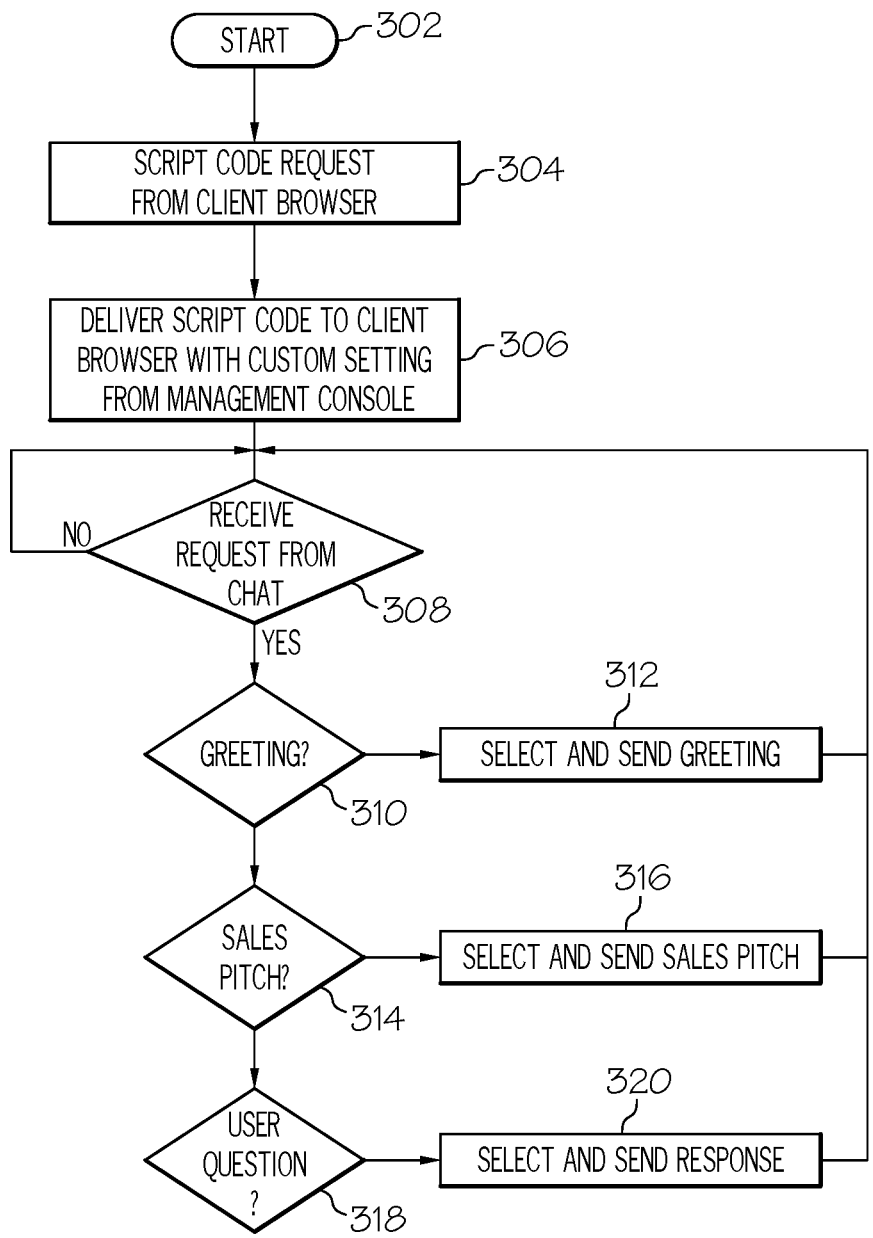
FIG. 3 is an example chatbot chat window flow from a TSA server perspective, according to the present invention.

FIG. 3 is an example chatbot chat window flow from a TSA server perspective, according to the present invention. This process runs when TSA chatbox window is loaded and the script request is from user on a client computer browsing a web retailer's web site. Examples of scripts used to integrate into a web retailer's website are illustrated at the end of this patent. The script code is sent along with various settings from the web-based management console in step 306. Various parameters or user selectable components are set through the TSA management console for the script settings. The script settings can include pitch delay, "agent is typing" message, typing times, and reading timer. These are discussed further below.

In one example, some of these settings are static, e.g. the various settable timers, reading timers, typing timers, are the same for all chat sessions. Other examples of settings are dynamic, e.g. agent photo, agent name, agent picture position on screen, campaign ID, timers, and greetings, sent only for when the particular chat session is initiated. In another example, the setting can be changed depending on information received from web retailer's site, such as demographic information or even personal information such as name of chat user. Further information such as a name of the chatbot, a persona presented (personality such as youthful, midwestern, age, and educational level) to a user, and a national language of the chatbot.

The process loop waits for a request from the chat in step 308. Once a request is received from chat 308, the process continues with determining the type of response, e.g. is it a greeting 310, then select and output greeting 312 based on preferences setup in TSA management console. Likewise, if the request is a sales pitch request, e.g. is it a sales pitch 314 then select and output sales pitch 316 based on preferences setup in TSA management console. Alternatively, if the request is a user question request, e.g. is it a user question 318, then select and output response 320 based on preferences setup in TSA management console. A more detailed explanation of the response selection process is discussed in FIG. 6 below.

Figure 4:
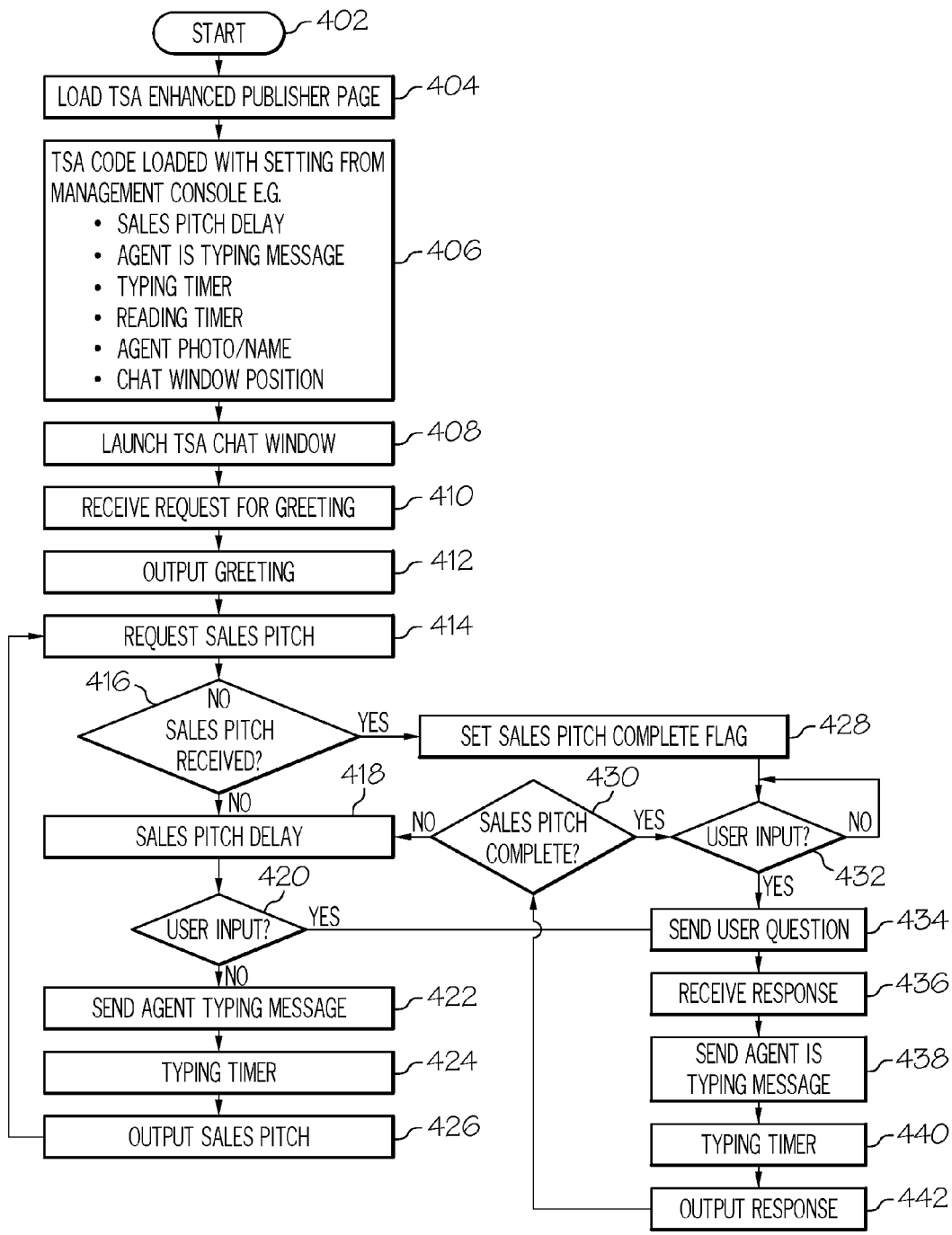
FIG. 4 is an example chatbot chat window flow from a TSA client perspective, according to the present invention.

FIG. 4 is an example chatbot chat window flow from a TSA client perspective, according to the present invention. The process begins at setup 402 and immediately proceeds to step 404 where the web retailer page with code for launching the chatbot is loaded. Examples of the code embedded in the web retailer page are shown at the end of this patent.

In step 406, the setting from the TSA management console are loaded such as, but not limited to, sales pitch delay, agent is typing message, typing timer, reading timer, agent photo/name, and chat window position.

The chatbot runs on the client device 102, 104, and 106 typically after a predefined event. The TSA window can load on various events such as the end-user leaving a web page, an abandoned shopping cart, a web page domain change, or other link selected. It should be understood the TSA window can launch on other events such as no input from the end-user for a predetermined amount of time. In one example, an inactivity timer is used to trigger the predefined event. This inactivity timer is set in the TSA Management console along with other times. Still, in another example, if the web page or primary applet is minimized, this is used to launch the chatbot. Still further, one or more cursor positions can be used to trigger when launching the chatbot such as the minimize cursor position, close cursor position, URL cursor position, help cursor position, hover for a period of time, and more. Accordingly, a decision is made whether or not to launch the chatbot chat window based on one or more even/response pair triggers. This decision to launch is made while the end-user is interacting with the web retailer's page or while interacting with a specific applet.

Once the chatbot chat window is loaded in step 408 as shown in FIG. 2, the Greeting Request is received 410 from the chat window and TSA server 130 produces the Output Greeting 412 to the chatbot chat window. Next, a sales pitch is requested 414 and a response received from the TSA server 130. The system uses the greeting and sales pitch, collectively known as events to sell, cross-sell or up-sell a product. The timing and when the sales pitch is displayed depends on whether a user of the chatbot chat window enters a question. The sales pitch can be a single entry or multiple entries to construct overall sales pitch. To begin, a test is made to determine in step 416 if a No Sales Pitch was received. If a No Sales Pitch was received (i.e. because either the sales pitch is complete or the web retailer is not using a sales pitch) the flow continues to step 428 and sets the Sales Pitch Complete Flag. In response to a sales pitch received in step 416 (i.e. the test in step 416 results in "no"); the sales pitch delay timer is started in step 418. When the timer expires, a test is made for user input 420. If there is user input received, in step 420, the flow continues to step 434. In response to no user input received, then in step 422 an "Agent is Typing" message is posted on the chat window (not shown) on FIG. 2. The "Agent is Typing" message is sent to notify the chat window user that a message is being formulated. This message is used to make the chatbot appear human rather than automated. Because a human typically will take time to read and type a response unlike a computer which is only limited by bandwidth and processing power, a delay "Typing Timer" 424 is set by configuration settings in the TSA management console. The sales pitch received as determined by the TSA management console settings is then printed in the chatbot chat window 426 and the process flows back to request another sales pitch 414 and then tests for another sales pitch or No Sales Pitch response 416.

In response to sales pitch was complete being completed, i.e. No Sales Pitch 416, the Sales Pitch Complete Flag 428 is set and a process loops on whether user input is received 432. Once a user question is received, it is sent to TSA server 103 and a response is received 436. To avoid the appearance of being too fast responding to a user question, a message on the chat box chat window "agent is typing" is displayed in step 438 and typing timer is set in step 440 before presenting the response 442 to the end-user. In the event the sales pitch was completed in step 430, the process loops in step 432 waiting for user input. Otherwise, the sales pitch process is continued in step 418.

Figure 5:
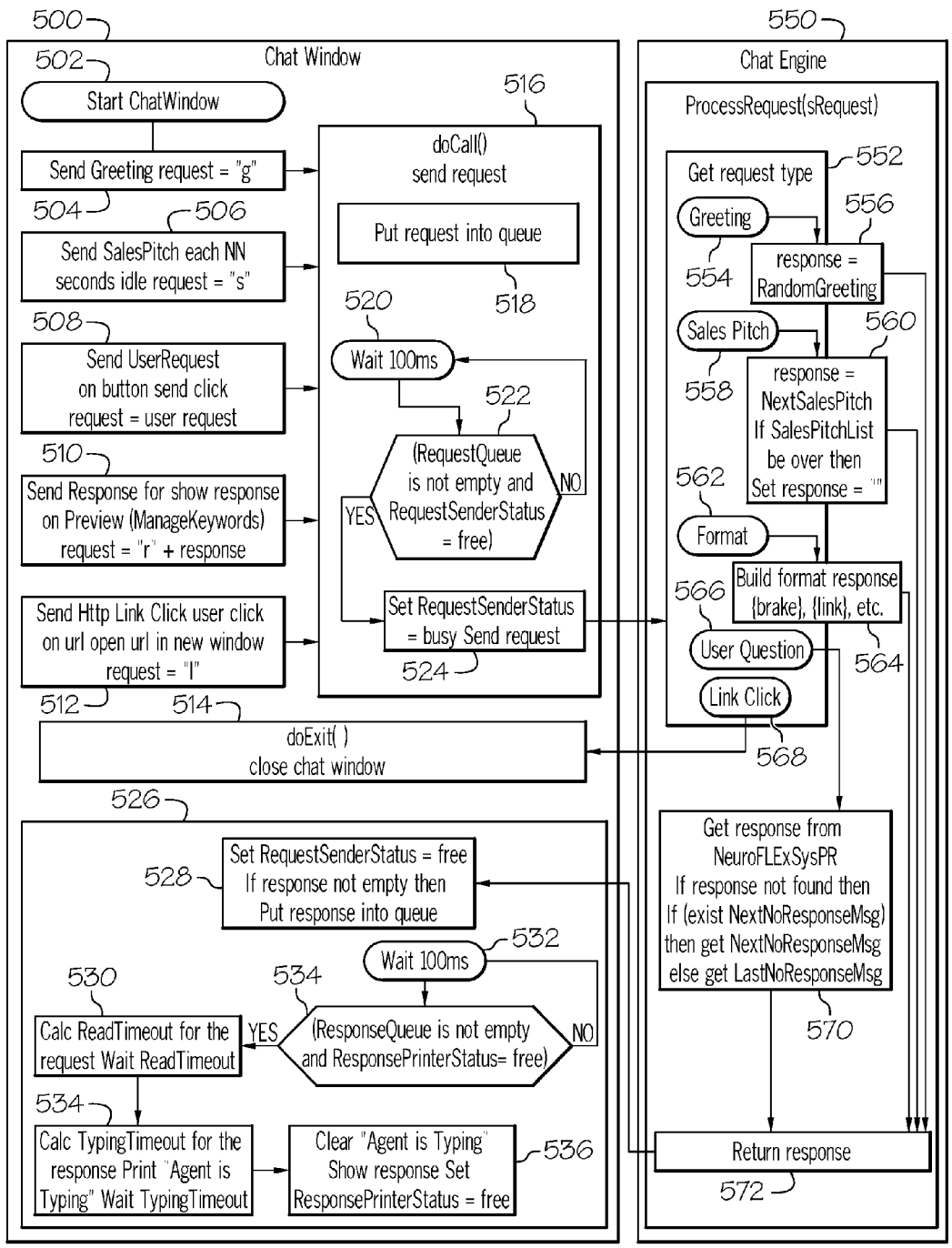
FIG. 5 is an example over-all flow from the TSA client-server perspective illustrating the interactions between the flows of FIG. 3 and FIG. 4, according to the present invention.

FIG. 5 is an example overall flow from the TSA client-server perspective illustrating the interactions between the flows of FIG. 3 and FIG. 4, according to the present invention. The chat window flow 500 begins with the chat window starting as described in FIG. 3 and example scripts discussed at the end of this patent. Boxes 504 "Send Greeting", 506 "Send Sales Pitch", 508 "Send user Request", 510 "Send Response", and 512 "Send HTTP Link" are various requests automatically made by the client 102, 104, and 106 to the TSA Server 130. The various requests 504, 506, 508, 510, and 512 as shown each go into a "Do Call Method" 516. The "Do Call Method" helps make the various calls synchronize with the Chat Engine 550 sitting on TSA server 130. The "Do Call Method" 516 includes a queue 518, Wait Time 520 by a predetermined number of seconds. The predetermined number of seconds is settable through the TSA management console and it should be understood that the 100 ms is an example only. The flags of Request Queue and the Request Sender Status 522 are used to determine whether the request is sent in 524 or the process loops back to Wait Time 520. This waiting and loop allow the "Do Call Method" 516 to synchronize if the request queue is "Empty" and the request sender status is "Free" so the message is sent out.

Chat engine 550 sitting on TSA server 130 receives request from the chat window 500 and finds answers to each request to send to the chat window 500. The process begins with Get Request Type 552 for passing the various requests to different sub-handlers depending on the type of the request. A response 572 is provided. There are two types of Request Types. A first type of request type is handled through the Engine 570 using artificial intelligence and/or neural networks. A second type of request type is handled by parameters, settings and responses for a campaign setup using the TSA management console. The sub-handlers include a sub-handler for "Greetings" 554, which tests whether the "Response=Random Greeting" is set by the TSA management console. The sub-handler "Sales Pitch" 558 and whether Reponse=MySite" is set by the TSA management console for a given campaign. The sub-handler "Format" 562 helps arrange and convert the answer to a request that is received from the chat window 500 based upon setting from the TSA management console. The sub-handler "Request" or "User Question" 566 handles general questions from a user typing in the Chat Window 500. The sub-handler "User Question" 566 uses the Engine 570 to find a response.

The Engine 570 in one example is a neural network engine. One example of an engine that has been shown to work advantageously with the present invention is disclosed in U.S. Pat. No. 7,529,722, with inventor Gene I. KOFMAN et al., filed on Dec. 22, 2004 entitled "AUTOMATIC CREATION OF NEURO-FUZZY EXPERT SYSTEM FROM ONLINE ANALYTICAL PROCESSING (OLAP) TOOLS", the teachings of which is hereby incorporated by reference in its entirety. The engine bases its responses on the probability of matches to a user question using Neuro-FLexSysPR. For error checking purposes if no response is found to a question, a no response is selected.

The response is sent from the Chat Engine 550 to Chat Window 500 and the method 526 handles the presentation of the response to the end-user. It may delay the response depending on TSA management console in loop 532 and 534. There are several timers set at the management console such as "agent typing timer", "delay agent timer" and other timers to make the chat bot appear human. The "agent is typing" message 534 is used to notify the end-user that a response to their questions is being formulated and composed. This "agent is typing" message is cleared when the response is complete.

Figure 6:
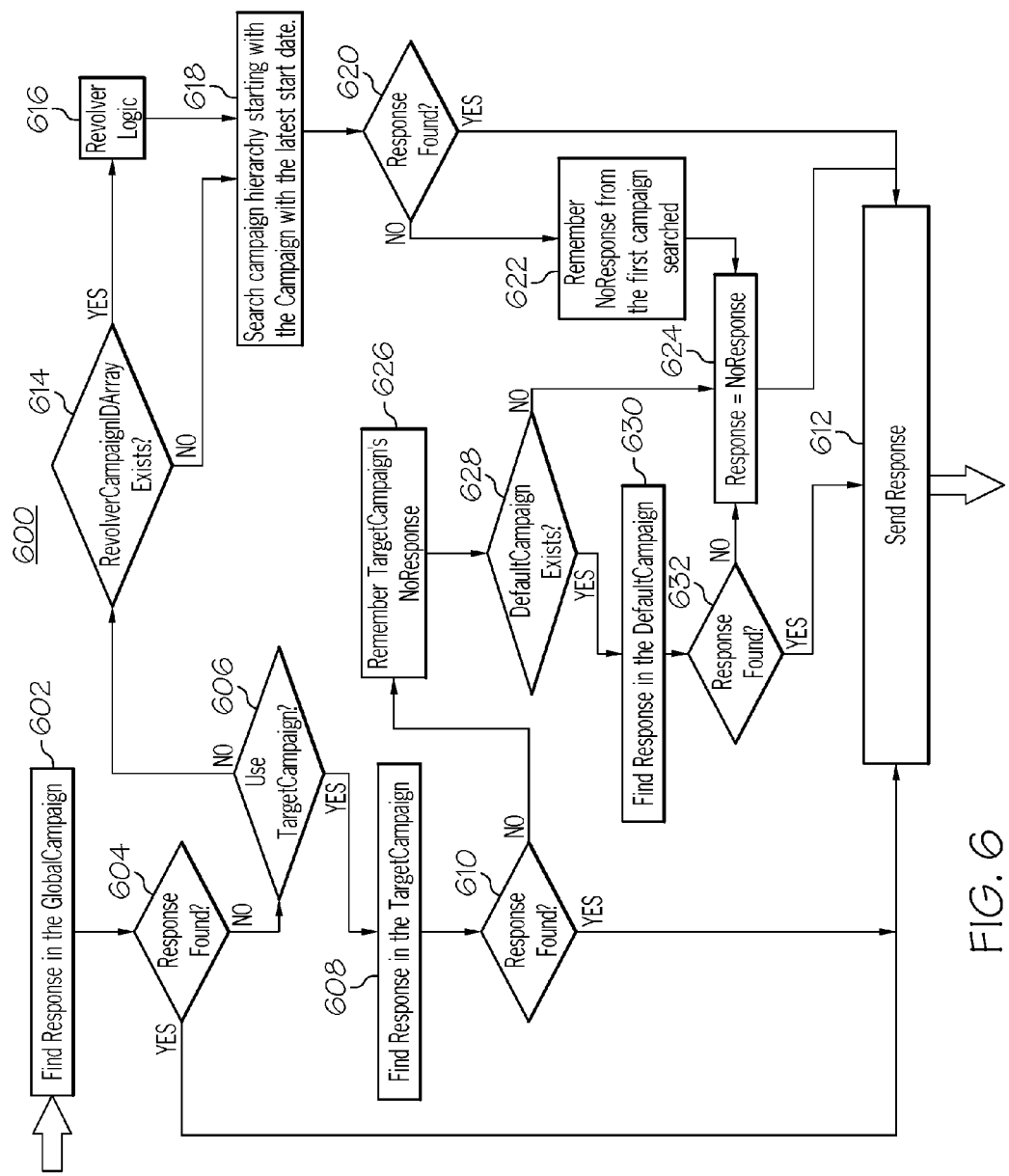
FIG. 6 is a more detailed flow of block 320 in FIG. 3 illustrating how the TSA server selects responses, according to the present invention.

FIG. 6 is an example overall flow diagram of how TSA server 130 selects a response in Chat Engine 570, according to the present invention. Again it is important to note that various parameters are set through the TSA management console by the web retailer such as campaign selection, decision method, keyword/response pairs, greetings, sales pitch, and a no response message. These are discussed further below.

The process begins at step 602 where responses to Global Campaigns are searched in order to identify user's questions that are to be handled the same, no matter the web retailer's campaign. Next in step 604, if a response is found the response is sent in step 612. However, if a response is not found, a test is made to determine if this is part of a target campaign in step 606. If it is part of a target campaign setup by a web retailer to handle a special product line or situation, the response for the target campaign is searched in step 608 and if a response is found in step 610, the response is sent in step 612. If a response is not found to a web retailer's target campaign the process continues to look at target campaign's no response settings previously set up through the TSA management console and save it, in step 626, for future use. If a default campaign exists, step 628, the default campaign, is searched in step 630 and, if the response is found in step 632 the response is sent in step 612. However if no response is found in step 632 or if a default campaign is not set up in step 628, the previously saved no response from step 626 is sent in step 612. The no response found setting in one example causes the chatbot to ask a clarifying question such as "please rephrase your question."

In the case where the target campaign is not used in step 606, the process flows direct to search the hierarchy in step 618 as shown. An example of a hierarchy of campaigns is a retailer site having a holiday special, then there is holiday terminology in the sales pitch or greeting or both, such as "Happy Holidays" or "We are running a special for Christmas!". There may also be a winter campaign and a default campaign. Each campaign may offer, for example different discounts, different delivery options and more. A target campaign is said to have precedence depending on when it is active. In this case, the campaign may take precedence from November 1st through December 24th. This precedence-in-time creates a hierarchy. If the holiday special campaign would answer any questions first from a user and if no answer is found, the system looks to other campaigns including the default campaign. This date-based hierarchy searches campaigns based on each campaign's start date; the campaign with the earliest start date is searched first. In the event a response is found in step 620, this is sent in step 612. However, in the event that no response is found, in step 620, the "no response" from the first campaign is set and a no response set in step 624 is sent in send response step 612. Although a date precedence hierarchy has been shown, other hierarchies such as sequence numbers have been shown to work advantageously within the true scope and spirit of the present invention.

Overview Internet Advertising

Figure 7:
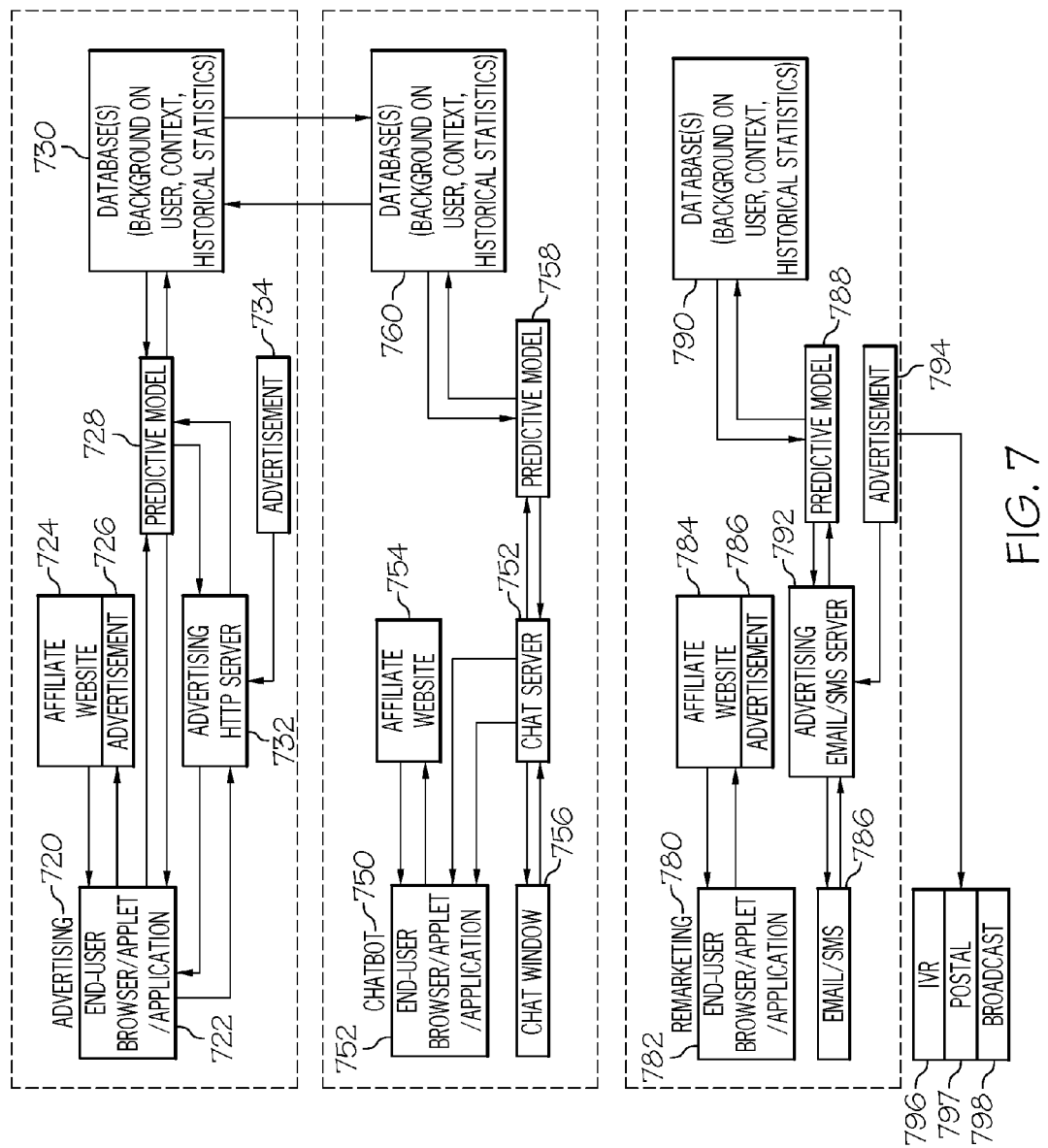
FIG. 7 is a block diagram of three internet-based advertising systems: i) an advertising system, ii) a chatbot system, and iii) a remarketing system.

FIG. 7 is a block diagram of three internet based advertising systems: i) an advertising system 720, ii) a chatbot system 750, and iii) a remarketing system 780. Each of these three advertising systems will now be discussed in-turn.

Advertising System 720

Starting with advertising system 720, an end-user using a web browser or other applet or application 722 on a computer, such as a smart phone, a laptop or tablet computer, begins by requesting an affiliate website 724. In one example, the affiliate website 724 is a website, such as a content provider with advertising space 726. An advertising server 732 which includes the predictive model 728 coupled to one or more context database(s) 730. The advertising server 732 includes a group of "offers" or direct advertisement in an advertisement database 734.

In operation, when an end-user, browsing on the Internet, accesses an affiliate's web site 724 which would typically include media content and advertising space 726, the end-user's browser 722 generates an http message to get the information for the desired Web page. The affiliate's web site 724 in response transmits one or more messages back containing the information to be displayed by the end-user's browser 722. In addition, the advertising server 732, using a local database 734 containing advertising and user data, provides additional information comprising one or more objects, such as a banner advertisement, to be displayed in the advertising space 726 along with the information content provided from the affiliate web site 724. Upon clicking through by selecting the advertising space 726, such as a banner advertisement, the browser 722 is connected to the direct advertiser's web site (not shown) i.e. a third-party website.

The basic operation of the advertisement system 720 provides for the selection of advertising targeted to the end-user on an affiliate website 724. The predictive model 728 processes all of the informational context in the database 730 and selects a single direct advertisement from a database of available advertisements 734, or a ranked order of direct advertisements to advertising server 732, to which the end-user is most likely to respond.

The direct advertisement that is selected is dynamically delivered through to the end-user for him or her to view through a web browser 722 to advertising space 726. The end-user may then interact with the direct advertisement. The end-user may respond to an interactive button on the advertisement, an Internet forms or lead-form, a fax-back systems, a toll-free number, a direct mail postcard. This interaction with the direct response advertisement(s) are used as explicit feedback and this context is updated in database 730. Feedback is transmitted back to the predictive model 728 directly from the end-user web browser 720 or through a proxy server, such as, the advertising server 732. For example, filling out a form, placing an order, supplying a credit card number, completing a survey, providing a survey or lead form, executing a software download, etc. are all forms of transactions. This feedback may include detailed information about a particular end-user's response to a direct advertisement, as well as the context, under which the response was obtained. Alternatively, the feedback may include a subset of the preceding information. Or, the feedback may convey information that the end-user did not respond to the advertisement, if such was the case. The feedback information is used by the predictive model 728 to further refine future predictions about the optimal advertisements to deliver and maximize utilization of the advertising space 726.

Transaction results of the direct advertisement placement are reported back to the predictive model 728. In one example, the direct advertiser's server 732 reports transactions back to the advertising server by a proxy (not shown) server. In another example, email reporting is used.

The history of website visits and browsing history may also be used to deliver relevant messaging. For example, if a given user has visited a baby products site, and a prepaid college site, the reports back the advertising server indicates the user is interested in information related to babies.

Chatbot System 750

Many of the functional details of chatbot system 750 are described in FIGS. 1-6 above. FIG. 7 is a high level comparison of chatbot system 750 as compared to the advertising system 720 and remarketing system 780. An end-user using a web browser or other applet or application 752 on a computer, such as a smart phone, a laptop or tablet computer, begins by requesting an affiliate website 754. A chatbot server 752, includes the predictive model 758 coupled to one or more context database(s) 760. The chatbot server 752 includes a chat engine 550 described above in FIG. 5 that responds to questions sent by end-users via chat window chatbot 756.

In operation, when an end-user, browsing on the Internet, accesses an affiliate's web site 724 which would typically include media content, triggers the chatbot 756 to launch. Launching of the chat window can be triggered by a variety of activities including no activity from the end-user within a settable period of time, leaving a web page, selecting specific links on a web page; a change in domain; abandoning a shopping cart; minimizing a web page; inactivity timer expiring; selection of click to chat button; and cursor position on the web page, or a combination of these. Once the chat window is launched, the chat engine 550 performs as described above in FIGS. 1-6. The chat engine in chat server 752 using a predictive model 758 processes the informational context in the database 760 and selects a single direct response from a database of available responses 760 to the end-user. In one example, initial greetings and the sales pitch may each be individually tailored to a specific user. For example, based on previous history on a particular affiliate website, questions about discounts and shipping may be common. Using this information the initial sales pitch for the affiliate website may be tailored to predict this question "Today Only—10% off coupon and Next Day". This sales pitch would be presented even before the end-user asks a question.

Information from the end-user through chat window 756 including questions, responses and reasons including "why" a transaction is being discontinued by the end-user are stored in database 760. This reason provides important additional information to the end-user's behavior. This interaction with the direct response from the end-user via chat window 756 is used as explicit feedback and this context is updated in database 760. For example, filling out a form, placing an order, supplying a credit card number, completing a survey, providing a survey or lead form, executing a software download, etc. are all forms of transactions. This feedback may include detailed information about a particular end-user's response to a direct advertisement, as well as the context under which the response was obtained. Alternatively, the feedback may include a subset of the preceding information. Or, the feedback may convey information that the end-user did not respond to the advertisement, if such was the case. The feedback information is used by the predictive model 758 to further refine future predictions about the optimal responses or offers to deliver from the chat server 752 to the end-user through chat window 756.

ReMarketing System 780

FIG. 7 is a high level comparison of remarketing system 780 as compared to the advertising system 720 and chatbot system 750. As with both the advertising system 720 and chatbot system 750, an end-user uses a web browser or other applet or application 782 on a computer and begins by requesting an affiliate website 784. An advertising server 792, such as an email server and/or short-message-service server is typically used. The advertising server 792 includes the predictive model 788 coupled to one or more context database(s) 790. The advertising server 792 includes a group of "offers" or direct advertisement in an advertisement database 794.

In operation, when an end-user, browsing on the Internet, accesses an affiliate's web site 784 which would typically include media content and advertising space 786, the end-user's browser 782 generates an http message to get the information for the desired Web page. The affiliate's web site 784, in response, transmits one or more messages back containing the information to be displayed by the end-user's browser 782. In addition, the advertising server 792, using a local database 794 containing advertising and user data, provides additional information comprising one or more objects, such as a banner advertisement. Upon clicking through by selecting the advertising space 786, such as a banner advertisement, the browser 782 is connected to the direct advertiser's web site (not shown) i.e. a third-party website.

The basic operation of the advertisement system 780 provides for the selection of email or text advertising targeted to the end-user. The predictive model 788 processes all of the informational context in the database 790 and selects a single direct advertisement from a database of available advertisements 784, or a ranked order of direct advertisements to advertising server 792, to which the end-user is most likely to respond.

The direct advertisement that is selected is dynamically delivered through to the end-user for him or her to view through email and/or text messaging. The end-user may then interact with the direct advertisement. The end-user may respond to an interactive button on the advertisement, an Internet forms or lead-form, a fax-back systems, a toll-free number, a direct mail postcard. This interaction with the direct response advertisement(s) are used as explicit feedback and this context is updated in database 790. Feedback is transmitted back to the predictive model 788 directly from the end-user through email, text or SMS messaging, a web browser 782 or through a proxy server, such as, the advertising server 732. For example, filling out a form, placing an order, supplying a credit card number, completing a survey, providing a survey or lead form, executing a software download, etc. are all forms of transactions. This feedback may include detailed information about a particular end-user's response to a direct advertisement, as well as the context, under which the response was obtained. Alternatively, the feedback may include a subset of the preceding information. Or, the feedback may convey information that the end-user did not respond to the advertisement, if such was the case. The feedback information is used by the predictive model 788 to further refine future predictions about the optimal advertisements to deliver and maximize utilization of the email or text messaging.

Using Feedback From ChatBot System 780

As the inventors have discovered, the chatBot system 750, unlike the advertising system 720 and the remarketing system 780, routinely receives insights to end-user behavior including reasons "why" a transaction is being discontinued by the end-user. These insights and other information are stored in database 760. In one example, this valuable reasoning is shared with either the advertising system 720 and the remarketing system 780 or both. For example, an end user is looking to purchase a good and while interacting with the chat server 752, the end-user shares that reason why they are discontinuing a transaction. The chat server 752 associates this information with the end-user. It is important to note that although a good is being described, the following example is applicable to the purchase of a service as well. The reason in this example is because one or more of:

shipping the selected good is too expensive.

shipping is not available to a shipping address provided by the prospective customer.

the available selection of the good is limited e.g. not correct sizes, color, quality.

financing is necessary to complete a purchase of the good.

Inability to pay with a specific instrument. For example the web site may only accept Visa and Mastercard, users wants to pay with AMEX or with a check or through PayPal.

inadequate security of the web page of the affiliate website, e.g. the merchant is unknown to the end-user or the user is on a public computer.

an inconvenient time to complete the transaction, e.g. end-user is catching a plane, getting into a cab, is currently at work.

an inconvenient location of the computer of the end-user e.g. the computer is in an office or is a public computer such as a library.

Selected good or service is perceived to be too expensive.

User may feel that he or she does not qualify for the offer. For example, the user may believe they are ineligible for a loan because of poor credit.

This information stored in database 760 is shared with an advertising system. Next time an advertisement is selected by the predictive model, it has a reason why the end-user as associated by the chat server 752 failed to complete a transaction and using this additional information to select the appropriate promotion or advertisement. For example, "Free-Shipping on all orders placed before mid-night" or "Check out our expanded collection of clothing for Big and Tall Men" or "Special financing and payment plans available today". The chat server 752 can reconcile associations with the advertising system 720 by placing an http cookie associated with the affiliate website for identification of an end user session, end-user's preferences, end-shopping cart contents, or anything else that can be accomplished through storing text data. In another example, the chat server 752 is given access to http cookies placed by either the advertising system 720 and/or the remarketing system 780 to associate information with a given end-user.

Sharing the end-user reasoning received by the chat server 752 to the advertising system 720 greatly enhances the quality of the promotion or advertisement sent by advertising system 720 to the end-user. For example, if a user is searching for computers a day or two ago and reviewed but did not purchase a computer, the predictive model will give higher priority to any advertisement from an available advertisement pool for computers to match the end-users interests.

In a similar manner, sharing the end-user reasoning received by the chat server 752 to the remarketing system 780 greatly enhances the quality of the promotion or advertisement sent by remarketing system 780 to the end-user. The advertisement can be real-time or delayed as described below. The advertisement can be delivered through the chat server 752, an email or text message 786, a voice mail message through an interactive voice system 796, a personalized print advertisement or postal advertisement 797 or a personalized broadcast advertisement through television and radio 798.

In one example, a temporal aspect to the advertisement is set by the advertising system 720 or remarketing system 780. End-user abandoning a shopping cart because selection is poor, may receive an advertisement only after the available selection of the goods/services from a given affiliate website has been expanded.

In another example, the present invention targets the abandon user for complimentary products. For example the user buys a used car, the present invention could cross-sell an extended warranty.

FIG. 8 is an example record 800 populated by the chat server with information including reason for discontinuing a transaction. This information can be populated for a single user id through use of http cookies or other mechanisms. The record includes an affiliate website ID, a reason for discontinuing a transaction 804, one or more items 806, such as a good or service being reviewed by end user, a unique end user id 808 to allow tracking across multiple affiliate sites and web sessions. The record 800 includes a date field 810 and time field 812, uniform resource location (URL) 814 of website as well. Information in this record is shared from the chatbot system 750 with the advertising system 720 or the remarking system 780 or both.

High-Level Flow of Using Feedback from Chatbot System 780

The process begins in step 902 and immediately proceeds to step 904 in which at least one chatbot is presented on a computer of a first party, such as end-user, as part of at least one messaging window of a web page document of a second party, an affiliate website. Next in step 906, information is received from the computer of a first party, in response to the chatbot, wherein the information includes at least one explanation by the first party for discontinuing a transaction with the second party. The transaction in one example is a sales-related transaction for a purchase of at least one of a good and a service from the second party. The sale-related transaction can include a lead-form.

The information received is associated with the first party in step 908. At least one advertisement from a third-party database is selected with the information received. Third party marketing databases include databases from advertisers (such as, ADSENSE, ADBRITE, BIDVERTISER, CHITIKA, INFOLINKS, POCKET CENTS, KONTERA, CLICKSOR, EXIT JUNCTION, DYNAMIC OXYGEN, ADBULL) and remarketing databases ICONTACT, BENCHMARK EMAIL, MAILIGEN, PINPOINTE, CONSTANT CONTACT, CAMPAIGNER, GRAPHICMAIL, MAD MIMI, VERTICAL RESPONSE, MAILCHIMP). In step 912, after a settable period of time, the advertisement is sent to the first party and the flow terminates in step 914.

Information Processing System

Figure 10:
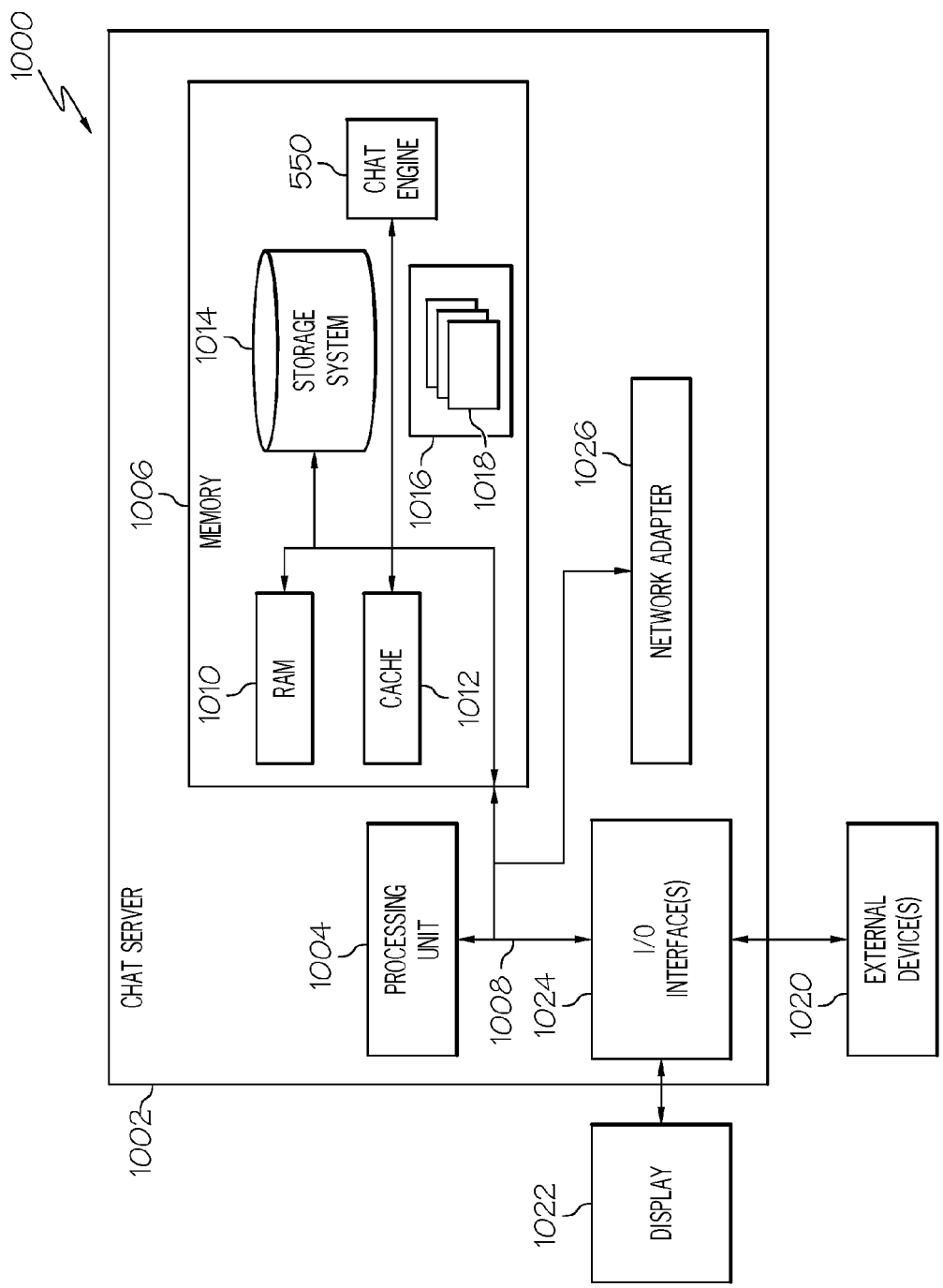
FIG. 10 is an example of an information processing system according to one embodiment of the present invention.

FIG. 10 is an example of an information processing system 1000 such as the chat server 752 of FIG. 7 with chat engine 550 of FIG. 5 as shown. In information processing system 1000 there is a computer system/server 1002, which is operational with numerous other general purpose or special purpose computing system environments or configurations. Examples of well-known computing systems, environments, and/or configurations that may be suitable for use with computer system/server 1002 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and the like.

Computer system/server 1002 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 10, computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

The system memory 1006 can include computer system readable media in the form of volatile memory, such as random access memory (RAM) 1010 and/or cache memory 1012. Computer system/server 1002 can further include other removable/non-removable, volatile/non-volatile computer system storage media. By way of example only, storage system 1014 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1016, having a set (at least one) of program modules 1018, may be stored in memory 1006 by way of example, and not limitation, as well as an operating system, one or more application programs, other program modules, and program data. Each of the operating systems, one or more application programs, other program modules, and program data or some combination thereof, may include an implementation of a networking environment. Program modules 1018 generally carry out the functions and/or methodologies of embodiments of the invention as described herein.

Computer system/server 1002 may also communicate with one or more external devices 1020 such as a keyboard, a pointing device, a display 1022, etc.; one or more devices that enable a user to interact with computer system/server 1002; and/or any devices (e.g., network card, modem, etc.) that enable computer system/server 1002 to communicate with one or more other computing devices. Such communication can occur via I/O interfaces 1024. Still yet, computer system/server 1002 can communicate with one or more networks such as a local area network (LAN), a general wide area network (WAN), and/or a public network (e.g., the Internet) via network adapter 1026. As depicted, network adapter 1026 communicates with the other components of computer system/server 1002 via bus 1008. It should be understood that although not shown, other hardware and/or software components could be used in conjunction with computer system/server 1002. Examples include, but are not limited to: microcode, device drivers, redundant processing units, external disk drive arrays, RAID systems, tape drives, and data archival storage systems, etc.

Mobile Device

Figure 11:
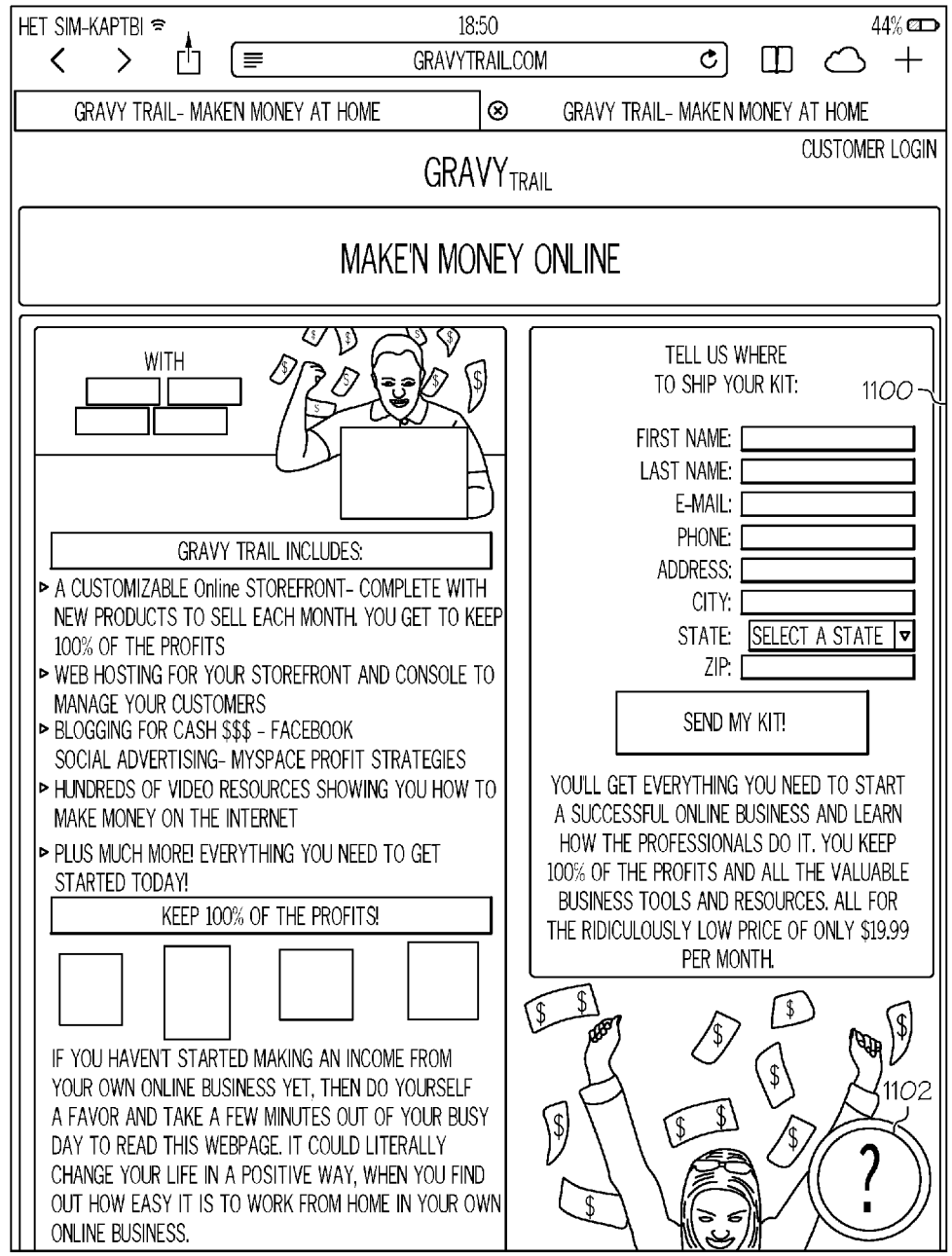
FIG. 11 is an example of screen shot of a wireless information processing system displaying a web page with a help button.
Figure 12:
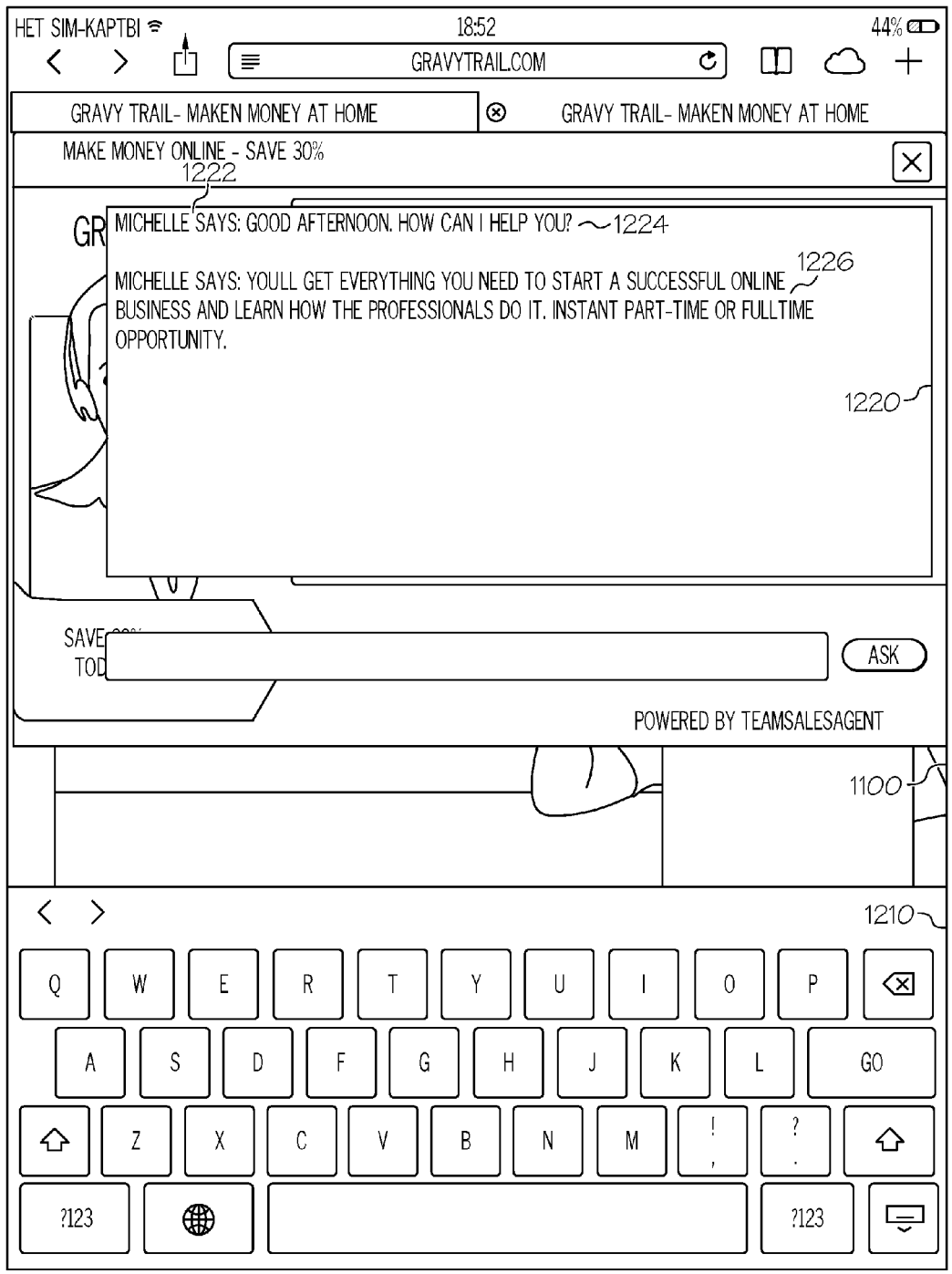
FIG. 12 is an example of screen shot of a wireless information processing system with a messaging window launched in response to the help button.

Turning now to FIG. 11 is an example of screen shot 1100 of a mobile information processing system displaying a web page with a help button 1102. Upon selection of the help button by the user using touch screen, mouse, or other pointing device, a messaging window 1220 is displayed, with an agent named "Michelle" 1222 as shown in FIG. 12. In addition two greetings are shown 1224 "Good Afternoon. How can I help you?" and 1226 "You'll get everything you need to start a successful online business and learn how the professionals do it. Instant part-time or full time opportunity." Also shown is a soft keyboard 1210 that is launched automatically with the messaging window 1220. In some examples, voice or handwriting recognition can be used in place of or simply to augment user input via the soft keyboard 1210.

Selection Using Demographic and Behavioral Information

Figure 9:
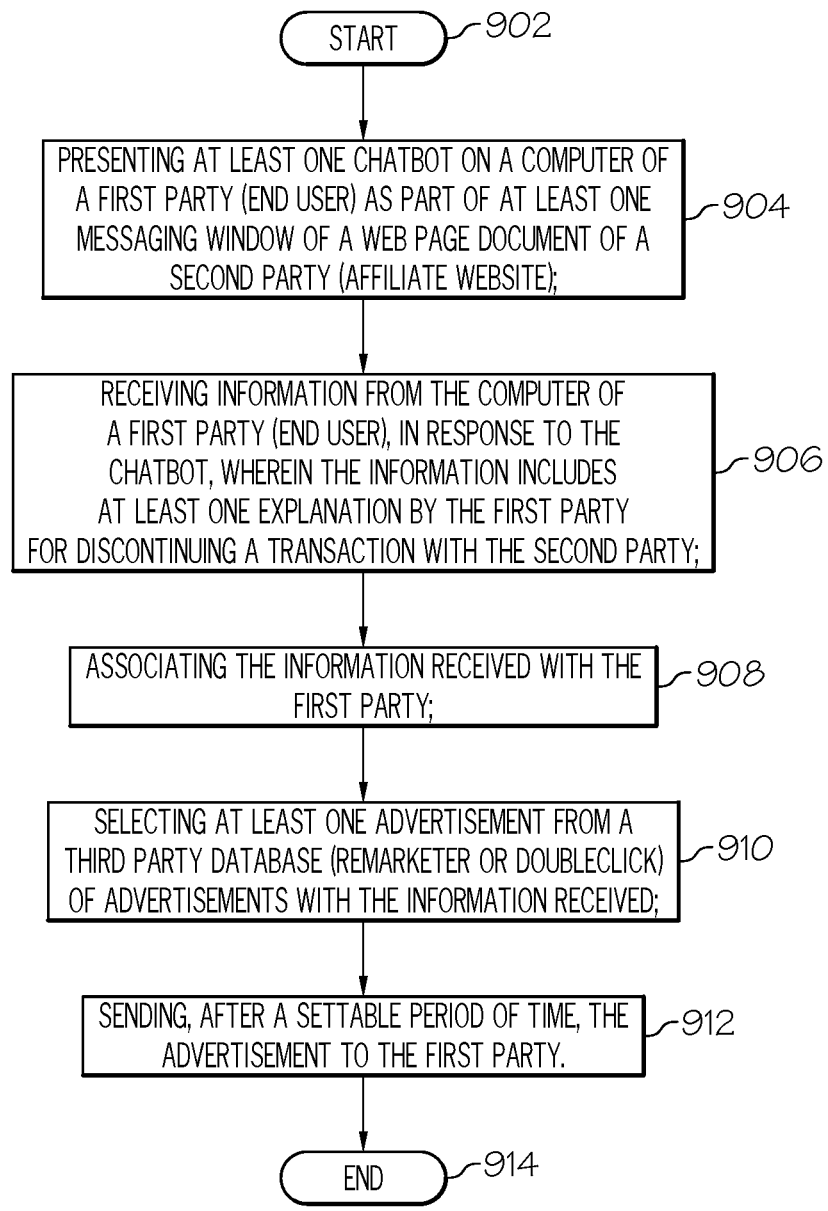
FIG. 9 is a high level flow of using information from the chatbot system.
Figure 13:
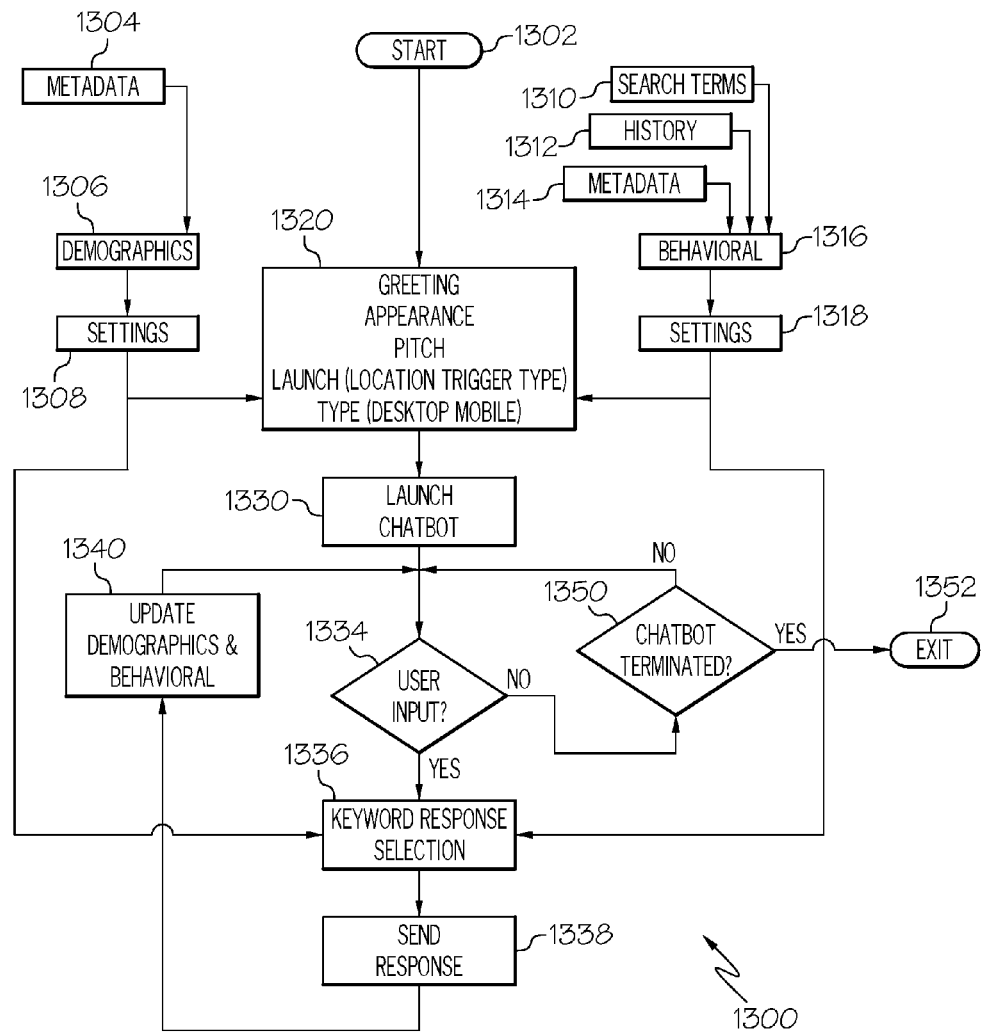
FIG. 13 is an example over-all flow for selection of the agent, the greeting, the sales pitch, or combination thereof based on demographic information and behavioral information.

FIG. 13 is an example over-all flow 1300 of information being used for selection of the chatbot. The selection of the chatbot includes an initial greeting, an appearance of the messaging window, and a picture of the agent. There are two major categories of information being used: 1) demographic information 1306, and 2) behavioral information 1316. The two major categories of inputs are further described with reference to table 1400 in FIG. 14 below. Starting with demographic information 1306, metadata 1304 such as information provide by a telephone company or referring website is used with demographic information 1306 associated with end user. Demographic information includes location of end user, age of end user, gender of end user, ethnicity of end user, language of end user, religious affiliation, etc. It is important to note that not all the geographic information for an end user may be available for each row of table 1400. Further, settings are adjusted through a management console. An example management console is shown in FIG. 9 and FIG. 10 of U.S. Pat. No. 7,962,578, which is hereby incorporated by reference in its entirety.

Turning to behavioral information 1316. Items in table 1400 in FIG. 14 below are used in the behavioral information. Examples include search terms 1310, web page history 1312, and metadata 1314 are used. Again it is important to note that not all the behavioral information for an end user may be available. Even with minimal behavior information being available, the selection algorithm is still effective. An example management console is shown in FIG. 9 and FIG. 10 of U.S. Pat. No. 7,962,578, which is hereby incorporated by reference in its entirety.

In step 1320 a combination of demographic information 1306 and behavioral information 1316 is used to select an initial greeting, an appearance of the messaging window, and a picture of an agent is selected. The selections of the chatbot attributes in step 1320 include using history and machine learning algorithms, such as Bayesian algorithms and neural networks. The machine learning algorithms can include both supervised and unsupervised algorithms. Further, settings 1308, 1318 are adjusted through a management console. It may override any of the selections or enhance any selections being made by the machine learning algorithms.

Once the information is customized the chatbot for a specific user, the chatbot is launched in step 1330.

A first test in step 1334 is determined if user input or message is received. If message is received in step 1336, one or more keywords in the message are identified. A response is selected using a combination of demographic information 1306 and behavioral information 1316 to send o the end user based on the keywords identified in the message. The selection of the response in step 1336 includes using history and machine learning algorithms, such as Bayesian algorithms and neural networks. The machine learning algorithms can include both supervised and unsupervised algorithms.

The message or response 1338 is sent from chatbot to user in step 1338. In one example, the message includes an advertisement, such a sales pitch, a coupon, a link, response advertisement may be sent to user by chatbot.

The process continues to step 1340 where the demographic information 1306 and behavioral information 1316 is updated. The process returns to step 1334 waiting for user input.

If no user input is received in step 1334, a determination is made in step 1350 if the chatbox is terminated. If it is terminated, the flow terminates in step 1352. The chatbot can be terminated by the user, or through a timer, or closing a web browser. Otherwise, in the event the chatbot is not terminated, the process loops back to step 1334 where the flow waits for user input.

FIG. 14A and FIG. 14B is table of information used by the behavior model of FIG. 13. Turning now to table 1400 of FIG. 14, the following column information is now defined:

- Geographic Location of End User 1410—the location of the person on the earth. The granularity of geographic location can be as broad a continent i.e. North America, or as specific as a global positioning system coordinate or wireless device triangulation on a street or inside a building. Geographic location is typically part of the demographic information of an end user.
- Age of End User 1412—is the length of time a person has lived. The granularity of the age can vary from an exact birth date of the end user to just a range i.e. 14-17 years old. Age is typically part of the demographic information of an end user.
- Gender of End User 1414—is the end user a male or female. It can also vary depending on cultural difference where social differences come into effect i.e. a biologically male person acting in a female gender. Gender is typically part of the demographic information of an end user.
- Ethnicity of End User 1416—is a social group that has common national or cultural traditions. Typically religion and language is also a common trait. Ethnicity is typically part of the demographic information of an end user.
- Language 1418—is a verbal or non-verbal style of communication. Major verbal languages are English, French, Spanish, German, Portuguese, German, Russian, Hindi, Mandarin, Cantonese, Arabic, Hebrew, and more. Examples of a non-verbal language is American Sign Language or Braille. Language is typically part of the demographic information of an end user.
- Religious Affiliation 1420—is a group of people that share a common set of organized beliefs. Major religions include Christianity, Islam, Hinduism, Judaism and Buddhism. Religious affiliation is typically part of the demographic information of an end user.
- Traffic Source 1422—is an understanding of how a user ends up on a particular web page. The traffic source can be a referring website from which a user navigated. Other traffic sources are typically from a clickable or selectable link, such as those from a search engine result, a search engine sponsored advertisement, a webpage advertisement, an email, and a text message.
- Web Page History 1424—is a record of web pages and/or web sites that a user has visited in the past. The web page history can be viewed by date, time of day, title, address (URL), alphabetical order, or number of repeat visits.
- Number of Related Web pages 1426—are a quantity of pages that share a common attribute such as type or category. Related web pages by type or category would include news, entertainment, search, retail, social networking.
- Terms 1428—are a quantity of search terms used by a given user for a search.
- Search Engine Terms 1430—are the words that a user has typed or entered into a search engine. These are the terms the search engine will try to match with the most relevant results.
- Items Reviewed On Web Pages 1432—is a quantity of products or services a user have looked at one a web site domain or across web site domains.
- Price Of Item(s) on Web page 1434—is the amount of money required for payment of a good or a service.
- Dollar Amount in shopping cart 1436—an aggregate or total sum of all the items in a shopping cart. The aggregate or sum may in one example take into consideration quantities. Where as in another examples quantities are not multiplied by the price of each item to produce a total sum.
- Payment Method 1438—are the ways a customer pays for the good or service. Typical payment methods include cash, checks, credit or debit cards, money orders, bank transfers and online payment services such as PayPal.
- Time and Date 1440—is the time and date the user is visiting a web page. The time and date may be broad to just a month or year or more specific to time and exact date. Moreover, the time and date can be stored in for each web page visited in the web page history.
- Visitor or Member/Registered User 1442—denotes whether the user is registered or a member belonging to a group related to the web page being viewed. Examples of members would be in an awards program, warehouse club, airline frequent flyer club, hotel club, and more. Otherwise if the user is not identified, they are viewed as a visitor.
- Previous Visitor (as opposed to Buyer) To Website 1444—whether a specific user has previously visited a given web page. This field is used to distinguish from a previous buyer. Tracking whether an end user is a previous visitor versus a buyer is important because it generally indicates an interest in a good or service at a website. However, some other factor may be causing the previous visitor from postponing purchasing a good or service. Common factors for postponing a purchase include shipping prices, availability, stock, payment types accepted and more.
- Telco 1446—is an abbreviation for "telephone company." The telephone company provides telephony and data communications services. Examples of telephone companies include ATT, Sprint, Verizon, and Comcast.
- Operating System of End User Device 1448—is the software that manages the computer hardware. Popular operating systems include Windows, Mac OS, Linux, Android, Windows, iOS, and BlackBerry OS.

Screen Size/Screen Resolution of End User Device 1450—the screen size or display size is the physical area where multimedia content and web pages are displayed. Screen size can be used in conjunction with operating system to determine whether to select an appearance and size of a message based on screen real estate. Screen resolution is the number of picture elements or pixels.

Other Website Supplied Information 1452—is metadata that may be supplied by the owner of the web page being viewed or via a search provider or advertiser.

The rows 1460 to 1476 are populated with numerous examples of both demographic and behavioral information. The information in table 1400 is captured through various techniques including browser cookies. Cookie and tracking technology are useful for gathering information such as browser type and operating system, tracking the number of visitors to a website, and understanding how visitors use the website. Cookies and other tracking technology can be used to be tied to personal information of an end user. Aggregate cookie and tracking information may be shared obtained with or shared with third parties.

There are two basic types of trackers, "first-party" trackers, which transfer text files to end user's computers in order to enable websites to remember user information, such as items they've placed in their shopping cart or field data for forms that have already been filled out, and "third-party" trackers, which also transfer files to users' computers in order to gather data about much more than just their session on the tracker's site of origin.

When a third-party tracker is downloaded by a computer, it assigns that machine with a unique identification number (something like "6xd714db1433 . . . ") stored inside a cookie associated with the web browser being used. If the tracker is using a technology called a "beacon," and can even record end user keystrokes.

When a tracker records websites visited and end user search queries, instant messages or emails using web-based systems, comments, etc.—it can quickly assemble a very thorough and accurate profile for each end user.

In fact, third-party trackers using beacon technology can match the data they collect about a specific end user in real time with other databases containing geolocation, financial, and medical information in order to expand the end user's profile to predict the specific end user's age, gender, zip code, income, marital status, parenthood, home ownership, as well as unique interests.

Two rows of table 1400 are now discussed as examples of tracking and building an accurate profile for two specific end users. The first example is described with reference to the entries in row 1460. The information already collected about this particular end user includes a zip code location, approximate age, exact gender, exact ethnicity, exact language, and no religious association. The traffic source is a hyperlink from a web search engine. Based on other information from behavioral entries i.e. browsing history, price of items in cart, search terms, it appears this end user is a frequent visitor. This specific end user is using a non-mobile device based on the display size and resolution, and OS. Therefore an initial greeting of financing or payment methods may encourage this end user to purchase a good or a service.

The second example is described with reference to the entries in row 1464, a lot of information is already collected about a particular end user including a very detailed GPS location, exact age, exact gender, exact ethnicity, exact language, exact religion. The traffic source is unknown. Based on other information from behavioral entries i.e. browsing history, price of items in cart, search terms, it appears this end user is motivated. This specific end user is using a mobile device based on the display size and resolution, and OS. Therefore an initial greeting announcing free shipping or a coupon viewable on a mobile device for free shipping on orders over $150 may convert this motivated end user to purchase.

Browser Address Bar Replacement or Overlay

Figure 15:
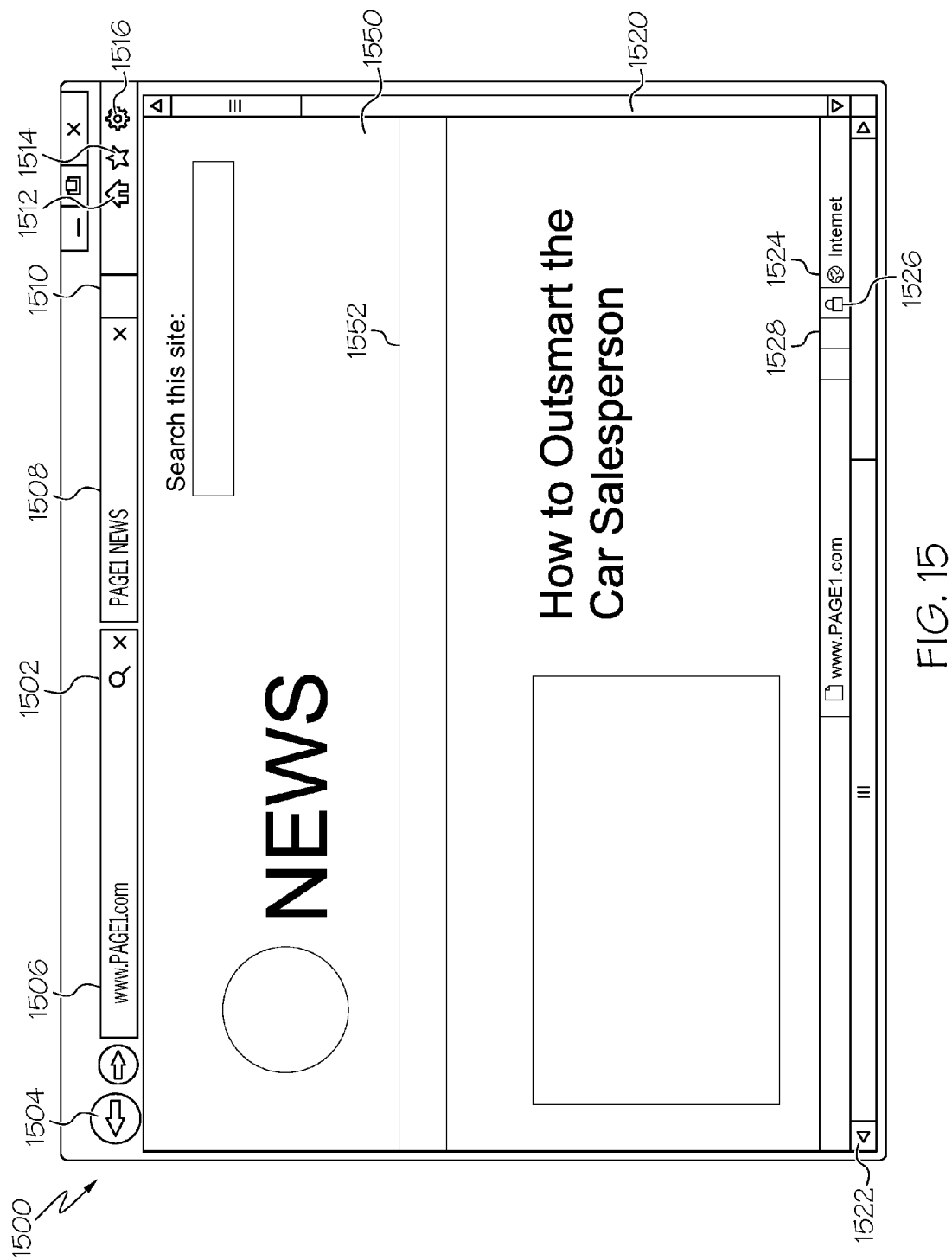
FIG. 15 illustrates major components of a web browser rendering a web page.

Turning now to FIG. 15, illustrates major components of a web browser 1500. A top bar 1502 also called a menu bar is shown. The web browser includes a browser window 1550 that renders text, image, and video content 1552 from a given web page. In this example the web page <www.page1.com> is shown in the address bar 1506. In other web browsers, the address bar 1506 bar also operates as a search bar. A selectable back navigation button 1504 to return to the previous web page or screen is shown. A title 1508 of the webpage in the web browser window 1550 is also illustrated. A browser tab 1510, enables multiple web sites to be open in a single web browser window. The home button 1512 is the default start page of the web browser 1500. The favorites button 1514 brings up designated webpages and news feeds. The tools icon 1516 allows the browser settings to be managed including items such as appearance, security, privacy and more. The web page content 1550 can be scrolled up or down or left or right. In this web browser a vertical scroll bar 1520 and horizontal scroll bar 1522 indicates the relative position of the web page content 1550 within the browser window 1502. Optionally, one or more bottom bars 1524 are shown. The bottom bar 1524 may have status 1528. One status includes the current state of the web page or window being displayed. For example, whether it is secure or not the page is secure 1526, its certificate, what is currently being loaded on the page, and the web address.

Figure 16:
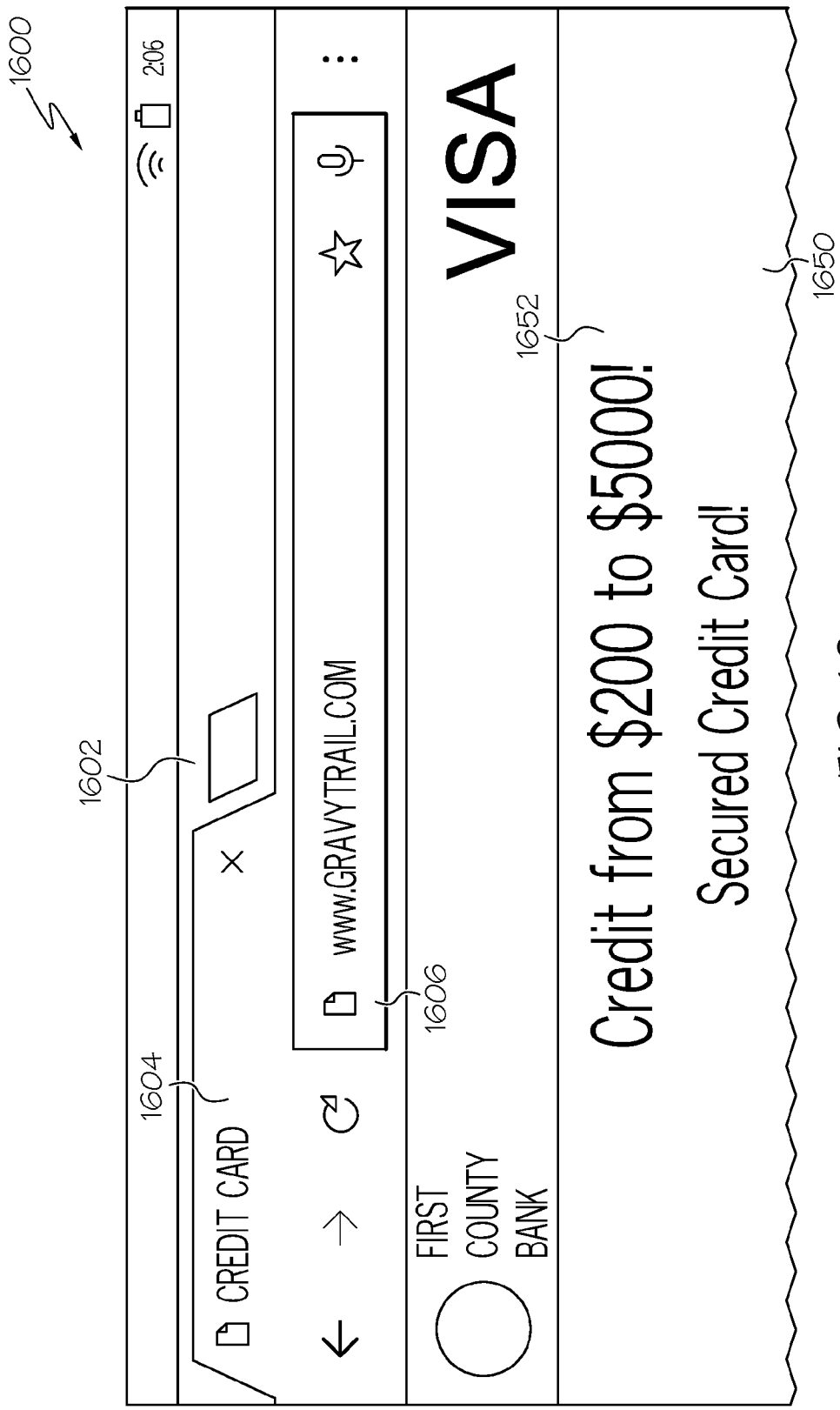
FIG. 16 illustrates an example web browsers rendering a web page with primary top bar with an address bar, a primary title, and a browser window.

FIG. 16 illustrates a web browser 1600 rendering an example web page content 1652 with a primary top bar 1602 that includes a primary title 1604, an address bar 1606, and a browser window 1602. In this example the web page content 1652 is displayed in the browser window 1650. Note this web browser 1600 has fewer components and features of the web browser 1500 in FIG. 15. This browser 1600 in FIG. 16 may be more suited to handheld devices such as cell phones and tablets in which screen real estate is more limited.

Figure 17:
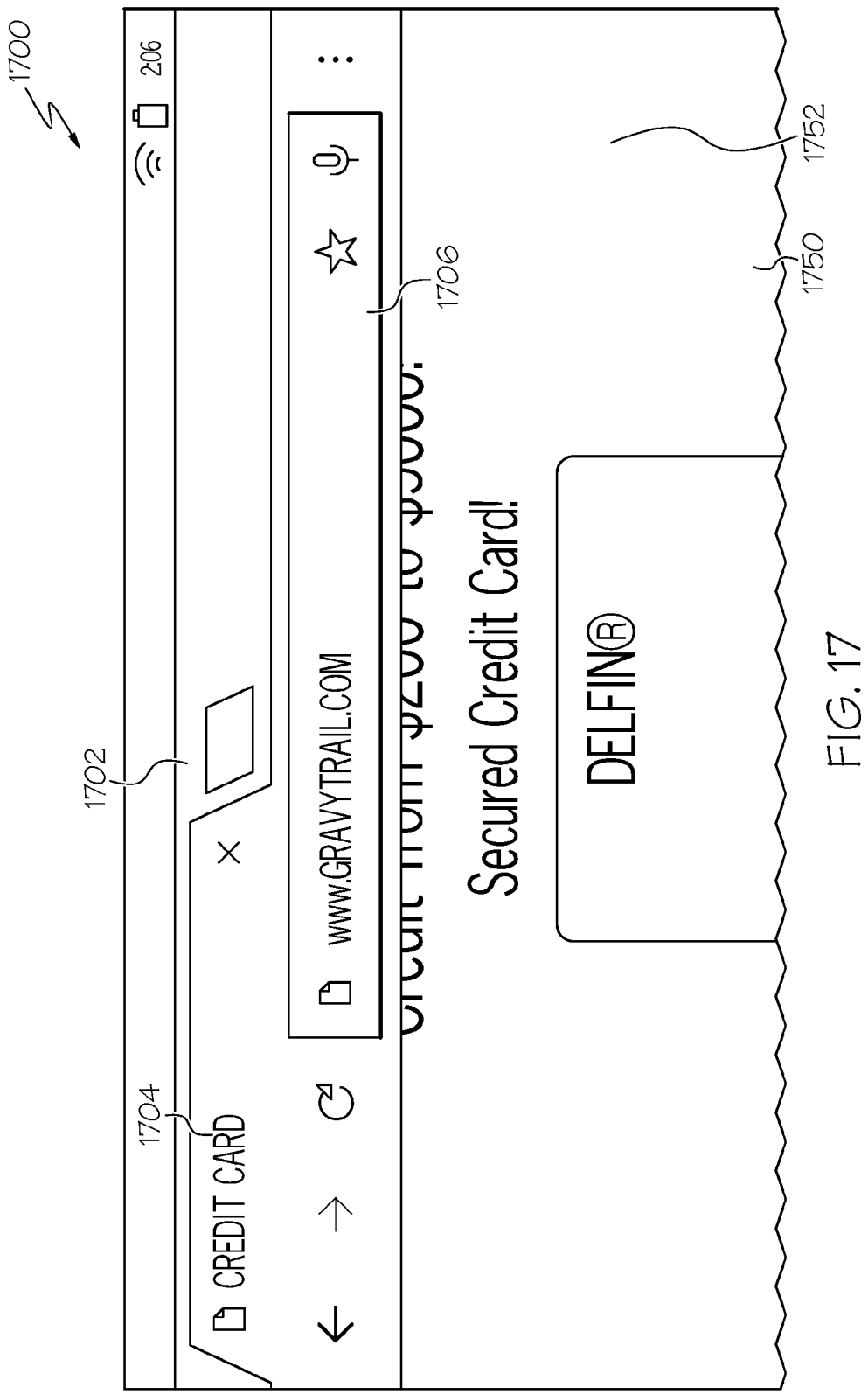
FIG. 17 illustrates an example web page with secondary top bar with a secondary address bar, a secondary title, and the same browser window of FIG. 16 after a vertical scroll.

FIG. 17 illustrates the web browser of FIG. 16 during a scroll operation. Note the web page content of the example web page 1752 is scrolled downward with respect the content 1652 of FIG. 16. The native or primary top bar 1602 disappears 1602. The scrolling of the web page content 1752 in any horizontal or vertical direction is a novel first trigger. An event handler such as window.onscroll is used. In another example other triggers are contemplated including a timer, eye tracking, and other user feedback.

In another example, in which the software code to track the first trigger is loaded after the primary or native top bar disappears or to increase the reliability of determining when the primary or native top bar 1602 disappears, the size of the browser window is determined. The handler such as window.onresize is used. This determines the size of the window. Depending on preset percentage of how much the window size changes, this can act as the first trigger to determine the native or primary header has disappeared.

In response to this first trigger, a secondary top bar 1702 is presented at substantially the identical position, i.e. the primary position, as the primary top bar is either being replaced or overlaid with the secondary top bar. Notice that this secondary top bar 1702 has substantially the same visual appearance as the primary address bar. Moreover, the secondary top bar in one example is part of the web page contents 1752 itself rather than a component of a web browser 1700. This is important since on may mobile browser the top bar often disappears once the user starts scrolling. Using this approach a user does not notice that the replacing or overlaying of the primary top bar 1602 with the secondary top bar 1702. In this example the primary address bar 1606 and the primary title 1604 of FIG. 16 is also replacing or overlaying with a secondary address bar 1706 and secondary title 1704. Just as described for above for the secondary top bar 1702, the secondary address bar 1706 and the secondary title 1704 has substantially the same visual appearance as the primary address bar 1606 and the primary title 1604. Using this approach a user does not notice that the replacing or overlaying of the primary top bar 1602 with the secondary top bar 1702.

Figure 18:
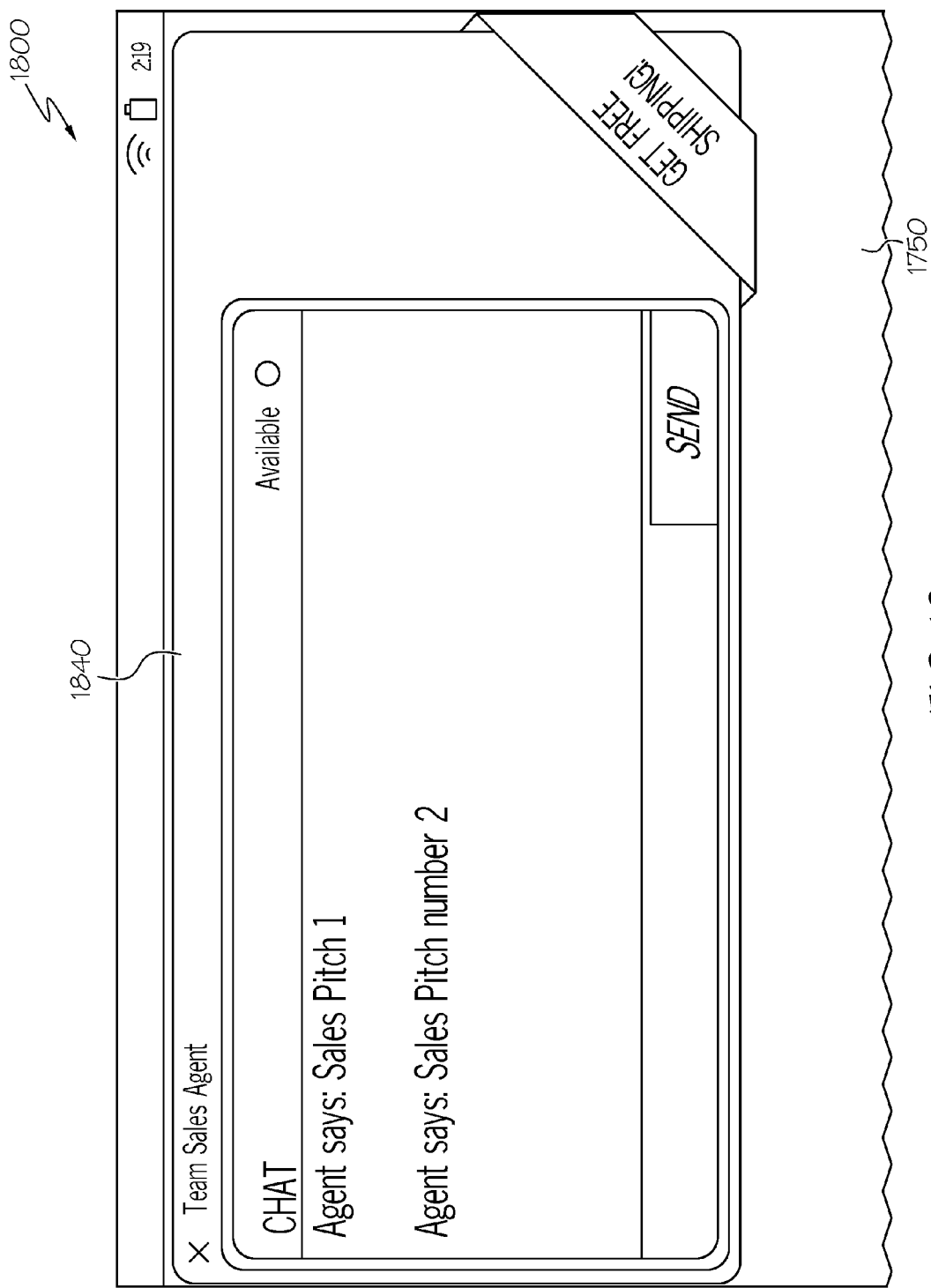
FIG. 18 illustrates a chat window being launched and in focus after the receiving user input in the vicinity of the secondary top bar.

FIG. 18 illustrates a chat window 1800 being launched and in focus after the receiving user input in the vicinity of the secondary address bar. The chat window 1840 in this example is on top of the previous browser window 1702 of FIG. 17 as a separate window or dialog box. The combination of two types of trigger events is novel. The first trigger is a user scrolling the web page contents 1752, or a timer expiring, or tracking a user gaze position or other user feedback. In response to this first trigger, the secondary top bar 1702 is presented. Next, further user input, for example, a user typing information in the secondary address bar 1806, acts as a second trigger. This second trigger is interpreted by the webpage owner that user is navigating away from the current displayed website to a different website. This combination of the first trigger and the second trigger acts as a type of "exit popup" trigger. The "exit popup" trigger is used in many older or legacy browsers especially on older Microsoft Windows based desktop operating systems. However in newer web browsers and new operating systems, especially most mobile operating systems, including Apple's iOS and Google's Android operating systems, exit popups are blocked. Using the combination of the first trigger and the second trigger described above, the webpage owner using the messaging window or chat window 1840 can attempt to recover lost customers or cross-sell or up-sell them. This novel first triggering and then second triggering mechanism is designed to effectively reduce shopping cart, lead and registration abandonment. The chat window 1800 present invention has to be capable of up-selling and cross-selling as well.

Figure 19:
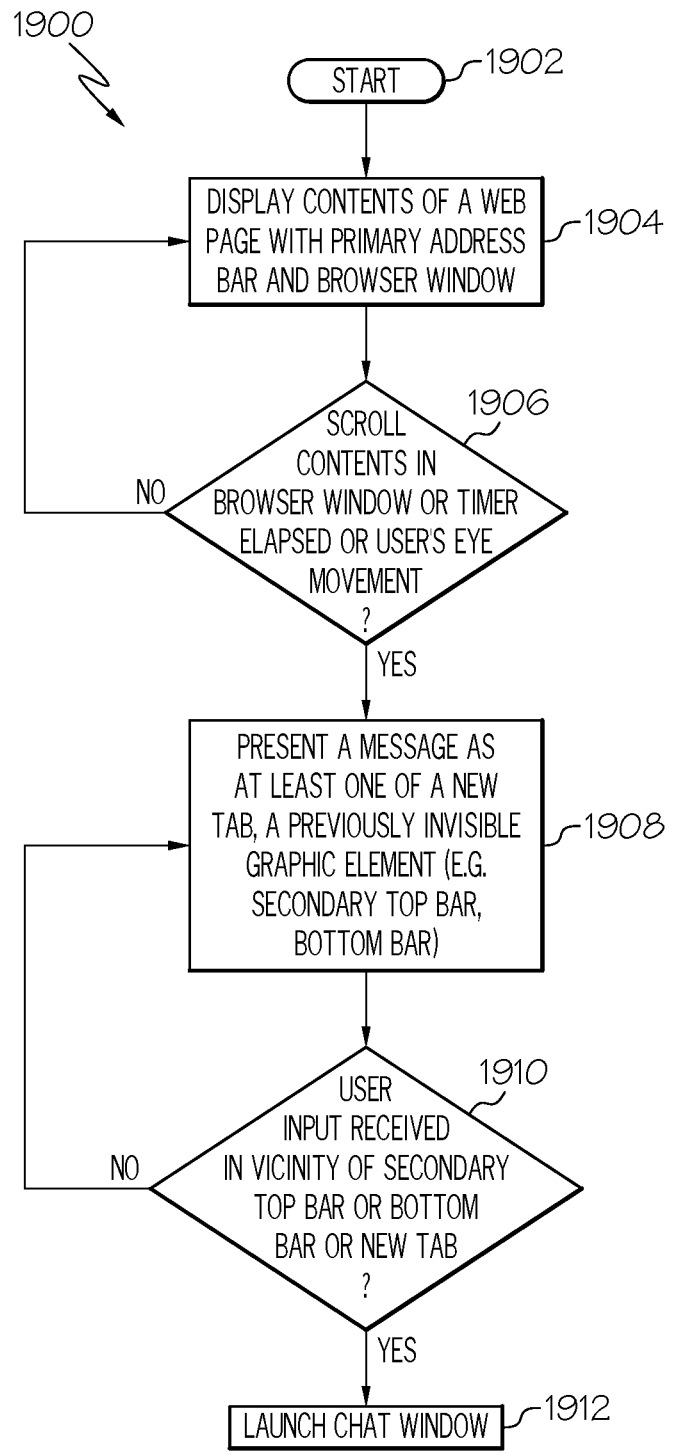
FIG. 19 is a flow diagram of replacing or overlaying the primary top bar with a secondary top bar and launching the chat window.

FIG. 19 is a flow diagram 1900 of replacing or overlaying the primary top bar with a secondary top bar and launching the chat window. The process starts at step 1902 and immediately proceeds to step 1904 in which the content of a webpage with a primary address bar and display window is shown. An example is shown in FIG. 16.

Step 1906, a determination is made if the window is scrolling the webpage contents of the web page in a vertical direction, a horizontal direction, or a combination of the two directions. In another example, a timer expiring, or tracking user eye movement, or other user input may be used. In the event the webpage content is being scrolled, such as in the vertical direction as shown in FIG. 17. The user input can be tactile input through a mouse, keyboard or other input device, voice input or eye tracking technologies. The process continues to step 1908. Otherwise the process loops back to step 1904. In step 1908, a message is presented as at least one of a new tab, a previously invisible graphical element such as a secondary top bar 1702. The process continues to step 1910.

In step 1910, the process determines if user input is received in the vicinity of the secondary top bar 1706 or new tab 1702. In response to a user input being received, the system interprets this as a trigger to launch the chat window or messaging window 1840. The chat window 1840 may include an audio sequence associate with it such as voice, or music, or alert tone.

In one example, messaging window includes a tool bar with user selectable icons. In another example, the messaging window includes displaying a web feed, a web channel feed, a rich site summary (RSS) or a combination thereof.

Like other embodiments described, the user is typically a first party, the webpage contents displayed in the browser is hosted by a second party, and the message is managed via a web-based management console by a third party, wherein each of the first party, the second party, and the third party are distinct and unrelated entities.

Non-Limiting Examples

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for presenting a message, the method comprising:

displaying, on a handheld device, contents of at least one webpage with webpage contents in a browser window with a primary top bar located at a primary position, and a display window within a single browser tab, and wherein the browser window includes a primary address bar located at a primary position;

in response to receiving an input to scroll the webpage contents, triggering a presentation of a previously invisible secondary top bar within the webpage contents of the webpage is now made visible within the browser window and displayed in the primary position of the primary top bar, thereby replacing the primary top bar of the browser window within the single browser tab; and in response to receiving user input in a vicinity of the previously invisible secondary top bar, triggering a presentation of a messaging window to appear within the browser window itself, another tab of the browser window, or a combination thereof and wherein the previously invisible secondary top bar is presented with at least a secondary address bar which is displayed in the primary position of the primary address bar, thereby replacing the primary address bar of the browser window.

2. The computer-implemented method of claim 1, wherein the browser window includes a primary address bar located at a primary position, and wherein the previously invisible secondary top bar is presented with at least a secondary address bar which is displayed in the primary position of the primary address bar, thereby replacing the primary address bar of the browser window.

3. The computer-implemented method of claim 2, wherein the browser window includes a primary title located at a primary position, and wherein the previously invisible secondary top bar is presented with at least a secondary title which is displayed in the primary position of the primary title, thereby replacing the primary title of the browser window.

4. The computer-implemented method of claim 1, wherein the browser window includes a primary bottom bar located at a primary position, and wherein the previously invisible secondary top bar is presented with at least a secondary bottom bar which is displayed in the primary position of the primary bottom bar, thereby either replacing or overlaying the primary bottom bar of the browser window.

5. The computer-implemented method of claim 1, wherein the browser window includes at least two primary tabs located at a primary position, and wherein the previously invisible secondary top bar is presented with at least two secondary tabs which are displayed in the primary position of the two primary tabs, thereby either replacing or overlaying the two primary tabs of the browser window.

6. The computer-implemented method of claim 1, wherein the input to scroll the webpage contents is a user's tactile input.

7. The computer-implemented method of claim 1, wherein the input to scroll the webpage contents is tracking a user's eye movement.

8. The computer-implemented method of claim 1, wherein the input to scroll the webpage contents is a user's voice input.

9. The computer-implemented method of claim 1, wherein the previously invisible secondary top bar is a new tab and the new tab has focus to receive further input.

10. The computer-implemented method of claim 1, wherein the previously invisible secondary top bar is made visible to appear as a separate window within the browser window and the separate window has focus to receive further input.

11. The computer-implemented method of claim 10, wherein the previously invisible secondary top bar includes a tool bar with user selectable icons.

12. The computer-implemented method of claim 10, wherein the previously invisible secondary top bar includes displaying a web feed, a web channel feed, a rich site summary (RSS), or a combination thereof.

13. The computer-implemented method of claim 1, wherein a handheld device is operated by a first party, the webpage contents displayed in the browser window is hosted by a second party, and the previously invisible secondary top bar is managed via a web-based management console by a third party, wherein each of the first party, the second party, and the third party are distinct and unrelated entities.

14. A computer-implemented method for presenting a message, the method comprising:
displaying, on a handheld device, contents of at least one webpage with webpage contents in a browser window with a primary title of the webpage and a primary top bar located at a primary position, and a display window within a single browser tab, and wherein the browser window includes a primary address bar located at a primary position; and
in response to receiving an input to scroll the webpage contents, triggering a presentation of a previously invisible secondary top bar within the webpage contents of the webpage is now made visible within the browser window and displayed in the primary position of the primary top bar, thereby replacing the primary top bar of the browser window within the single browser tab and wherein the previously invisible secondary top bar is presented with at least a secondary address bar which is displayed in the primary position of the primary address bar, thereby replacing the primary address bar of the browser window.

15. A system for presenting a message, the system comprising:
a computer memory capable of storing machine instructions;
a processor in communication with said computer memory, said processor configured to access the computer memory, the processor performing
displaying, on a handheld device, contents of at least one webpage with webpage contents in a browser window with a primary top bar located at a primary position, and a display window within a single browser tab, and wherein the browser window includes a primary address bar located at a primary position;
in response to at receiving an input to scroll the webpage contents, triggering a presentation of a previously invisible secondary top bar within the webpage contents of the webpage is now made visible within the browser window and displayed in the primary position of the primary top bar, thereby replacing the primary top bar of the browser window within the single browser tab; and
in response to receiving user input in a vicinity of the previously invisible secondary top bar, triggering a presentation of a messaging window to appear within the browser window itself, another tab of the browser window, or a combination thereof, and wherein the previously invisible secondary top bar is presented with at least a secondary address bar which is displayed in the primary position of the primary address bar, thereby replacing the primary address bar of the browser window.

16. A non-transitory computer program product tangibly embodying computer readable instructions which, when implemented, cause a computer to carry out the steps of a method for presenting a message, comprising:
displaying, on a handheld device, contents of at least one webpage with webpage contents in a browser window with a primary top bar located at a primary position, and a display window within a single browser tab, and wherein the browser window includes a primary address bar located at a primary position;

in response to receiving an input to scroll the webpage contents, triggering a presentation of a previously invisible secondary top bar within the webpage contents of the webpage is now made visible within the browser window and displayed in the primary position of the primary top bar, thereby replacing the primary top bar of the browser window within a single browser tab; and in response to receiving user input in a vicinity of the previously invisible secondary top bar, triggering a presentation of a messaging window to appear within the browser window itself, another tab of the browser window, or a combination thereof, and wherein the previously invisible secondary top bar is presented with at least a secondary address bar which is displayed in the primary position of the primary address bar, thereby replacing the primary address bar of the browser window.

* * * * *